United States Patent
Sugihara et al.

(10) Patent No.: US 7,909,140 B2
(45) Date of Patent: Mar. 22, 2011

(54) LUBRICATING STRUCTURE OF PLANETARY GEAR MECHANISM

(75) Inventors: Tsuyoshi Sugihara, Fuji (JP); Takamitsu Niibune, Fuji (JP); Tooru Koyama, Fuji (JP)

(73) Assignee: Jatco Ltd (JP)

( * ) Notice: Subject to any disclaimer, the term of this patent is extended or adjusted under 35 U.S.C. 154(b) by 1091 days.

(21) Appl. No.: 11/233,863

(22) Filed: Sep. 23, 2005

(65) Prior Publication Data

US 2006/0065488 A1   Mar. 30, 2006

(30) Foreign Application Priority Data

Sep. 24, 2004   (JP) ................................. 2004-277745

(51) Int. Cl.
*F16H 57/04*   (2010.01)
*F16D 13/72*   (2006.01)

(52) U.S. Cl. .... 184/6.12; 475/159; 475/116; 192/70.12; 192/113.34; 192/106 F; 192/85 AA

(58) Field of Classification Search ................. 184/6.12; 475/159, 116; 192/70.12, 113.34, 106 F, 192/85 AA
See application file for complete search history.

(56) References Cited

U.S. PATENT DOCUMENTS

| | | | | |
|---|---|---|---|---|
| 5,069,657 A | * | 12/1991 | Taniguchi et al. | ............. 475/283 |
| 5,630,492 A | * | 5/1997 | Yoshikawa et al. | ........ 192/106 F |
| 5,647,467 A | | 7/1997 | Yamauchi | |
| 2004/0077449 A1 | | 4/2004 | Biermann et al. | |

FOREIGN PATENT DOCUMENTS

| | | | |
|---|---|---|---|
| DE | 102 48 172 A1 | | 4/2004 |
| EP | 0 738 843 A2 | | 10/1996 |
| JP | 7-208587 A | | 8/1995 |
| JP | 08-270767 | * | 10/1996 |
| JP | 2002-286119 A | | 10/2002 |
| JP | 2004-028291 | * | 1/2004 |

OTHER PUBLICATIONS

Relevant portion of European Search Report and opinion of corresponding European Application 05255796.4-2421.

* cited by examiner

*Primary Examiner* — Bradley T King
*Assistant Examiner* — Mahbubur Rashid
(74) *Attorney, Agent, or Firm* — Rossi, Kimms & McDowell LLP

(57) ABSTRACT

There is provided a lubricating structure of a planetary gear mechanism which can simplify the outer shape of an introducing section formed by an oil catch plate, for introducing lubricating oil, and ensure a high degree of design freedom. In a double pinion type planetary gear mechanism, the distance from the axis of a carrier to the outermost edge of an opening in the direction of the carrier's diameter in an lubricating oil introducing hole formed in an outer diameter side pinion shaft and the distance from the axis of the carrier to the outermost edge of an opening in the direction of the carrier's diameter in an lubricating oil introducing hole formed in an inner diameter side pinion shaft are equal to each other. Therefore, lubricating oil can be supplied to the inner diameter side pinion shaft through the introducing section irrespective of the amount of lubricating oil that can be supplied to the outer diameter side pinion shaft. Also, the shape of a centrifugal cancel piston as the oil catch plate forming the introducing section can be simplified to increase the degree of design freedom.

3 Claims, 22 Drawing Sheets

LUBRICATING STRUCTURE OF PLANETARY GEAR MECHANISM

BACKGROUND OF THE INVENTION

1. Field of the Invention

The present invention relates to a lubricating structure of a planetary gear mechanism which introduces lubricating oil into a double pinion type planetary gear mechanism for an automatic transmission of a vehicle.

2. Description of the Prior Art

Conventionally, many of planetary gear mechanisms provided in automatic transmissions have been used more frequently and rotated at higher speeds as compared with other rotary members in the automatic transmissions. For this reason, an oil catch plate has been generally provided on a side face of a carrier in the planetary gear mechanism so as to lead lubricating oil to bearing members that support pinion shafts in the planetary gear mechanism and the surfaces of teeth to lubricate them.

By equipping the planetary gear mechanism with the oil catch plate as mentioned above, it is possible to catch a large amount of oil splashing from the center of a shaft and to store the caught oil at a position away from the center of the shaft, and hence a large amount of oil has been introduced as lubricating oil through openings of a lubricating oil introducing holes formed in a side face of a carrier plate through action of relatively high centrifugal oil pressure.

In the case of a planetary gear mechanism in which a single pinion is engaged with a sun gear and a ring gear, i.e. a single pinion type planetary gear mechanism among the above-mentioned planetary gear mechanisms equipped with the oil catch plate, the distances from a plurality of pinion shafts arranged in the circumferential direction to the axis of the carrier are equal, and hence lubricating oil caught by the oil catch plate is uniformly supplied to the pinion shafts.

However, in the case of a double pinion type planetary gear mechanism or Ravigneaus type planetary gear mechanism, the distance from the shaft of a pinion engaged with the ring gear to the axis of the carrier of the planetary gear mechanism and the distance from the shaft of a pinion engaged with the sun gear to the axis of the carrier of the planetary gear mechanism are different from each other. Thus, lubricating oil caught by the oil catch plate is supplied first to a lubricating oil introducing hole of the pinion shaft located on the outer diameter side of the shaft of the planetary gear mechanism, and then lubricating oil that remains above the amount of lubricating oil that can be supplied to the pinion shaft on the outer diameter side is introduced to a lubricating oil introducing hole of the pinion shaft on the inner diameter side.

As a result, in the case where the amount of lubricating oil caught by the oil catch plate is less than the amount of lubricating oil that can be supplied to the outer diameter side pinion shaft, lubricating oil is not supplied to the inner diameter side pinion shaft, which may decrease the durability of the bearing section of the pinion shaft on the inner diameter side.

To solve this problem, there has been proposed a planetary gear mechanism in Japanese Laid-Open Patent Publication (Kokai) No. 2002-286119. In this planetary gear mechanism, the oil catch plate is formed with an introducing section for introducing lubricating oil to the outer diameter side pinion shaft and an introducing section for lubricating oil to the inner diameter side pinion shaft are configured as chambers independent of each other so that lubricating oil can be supplied to the inner diameter side pinion shaft irrespective of the amount of lubricating oil that can be supplied to the outer diameter side pinion shaft.

However, in the double pinion type planetary gear mechanism or Ravigneaus type planetary gear mechanism, if the oil catch plate is formed with the respective introducing sections for supplying lubricating oil to the pinion shaft on the outer diameter side and the pinion shaft on the inner diameter side, the outer periphery of the oil catch plate is complicated in shape, resulting in a low degree of design freedom. For example, it is difficult to dispose sealing members for improving the sealing capability of the lubricating oil introducing sections on the outer peripheries of the introducing sections of the oil catch plate.

SUMMARY OF THE INVENTION

It is therefore an object of the present invention to provide a lubricating structure of a double pinion type planetary gear mechanism provided with an oil catch plate for catching splashing oil, in which the outer shape of an introducing section formed by the oil catch plate, for introducing lubricating oil can be simplified to ensure a high degree of design freedom.

To attain the above object, there is provided a lubricating structure of a planetary gear mechanism, comprising: a carrier that supports an inner diameter side pinion shaft of an inner diameter side pinion and supports an outer diameter side pinion shaft of an outer diameter side pinion disposed on then outer side of the inner diameter side pinion shaft; and an oil catch plate provided on a side face of the carrier, the oil catch plate forming an introducing section for introducing lubricating oil from the inner diameter side of the carrier into the inner diameter side pinion and the outer diameter side pinion, wherein an inner diameter side lubricating oil introducing hole and an outer diameter side lubricating oil introducing hole for introducing lubricating oil are formed in respective end faces of the inner diameter side pinion and the outer diameter side pinion on a side of the oil catch plate, and wherein the distance from the axis of the carrier to the outermost edge of the outer diameter side lubricating oil introducing hole in a direction of the carrier's diameter and the distance from the axis of the carrier to the outermost edge of the inner diameter side lubricating oil introducing hole in the direction of the carrier's diameter are equal to each other.

According to the present invention, since the distance from the axis of the carrier to the outermost edge of the outer diameter side lubricating oil introducing hole in the direction of the carrier's diameter and the distance from the axis of the carrier to the outermost edge of the inner diameter side lubricating oil introducing hole in the direction of the carrier's diameter are equal to each other, the same amount of lubricating oil can be supplied to the outer diameter side lubricating oil introducing hole and the inner diameter side lubricating oil introducing hole without forming separate introducing sections for introducing the outer diameter side lubricating oil introducing hole and the inner diameter side lubricating oil introducing hole on the oil catch plate.

Further, since it is unnecessary to form separate introducing sections for supplying lubricating oil to the outer diameter side lubricating oil introducing hole and the inner diameter side lubricating oil introducing hole, the outer shape of the introducing section of the oil catch plate can be simplified, thus ensuring a high degree of design freedom for the planetary gear mechanism.

Other features and advantages of the present invention will apparent from the following detailed description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the present invention will be described in detail in accordance with the accompanying drawings.

Figure 1:
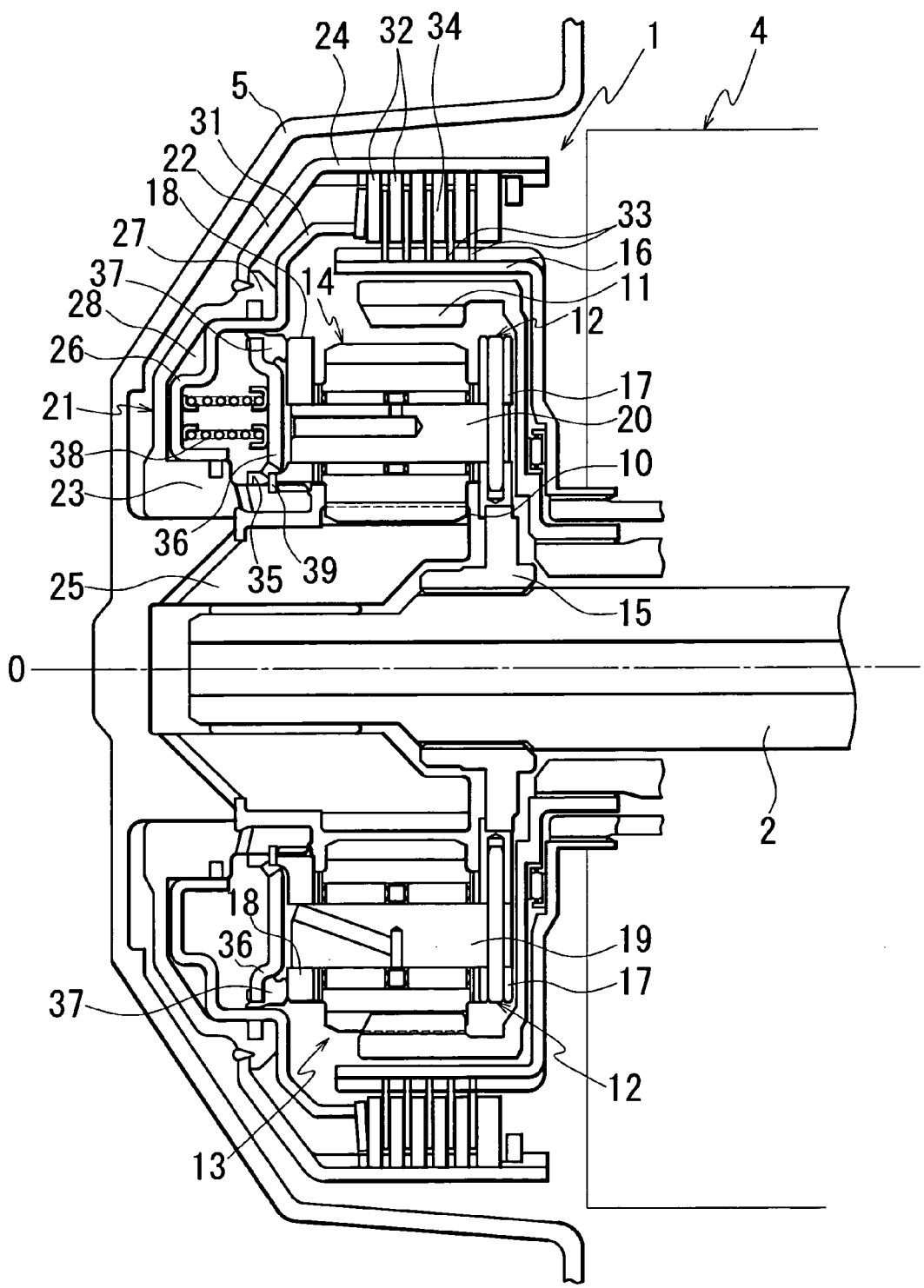
FIG. 1 is a cross-sectional view showing the construction of an automatic transmission.

FIG. 1 is a sectional view showing the construction of a double pinion type planetary gear mechanism applied to an automatic transmission.

Torque input from a drive source such as an engine is input to one end of an input shaft 2 via a torque converter, not shown, and input to a double pinion type planetary gear mechanism 1 provided at the other end of the input shaft 2.

The double pinion type planetary gear mechanism 1 changes the speed of the input torque and transmits or interrupts torque.

The torque input to the double pinion type planetary gear mechanism 1 is input to a shift mechanism 4 to change the gear ratio to a desired one, and then output to driving wheels of a vehicle via an output shaft and a differential gear, not shown.

The double pinion type planetary gear mechanism 1 is comprised of a sun gear 10 that is formed in a transmission case 5 of the automatic transmission, a ring gear 11 that is disposed on the outer diameter side of the sun gear 10 and has teeth projected inward, an outer diameter side pinion 13 that is engaged with the ring gear 11, an inner diameter side pinion 14 that is engaged with the sun gear 10, and a carrier 12 that rotatably supports the outer diameter side pinion 13 and the inner diameter side pinion 14.

The outer diameter side pinion 13 and the inner diameter side pinion 14 are engaged with each other.

The carrier 12 is comprised of a first carrier plate 17 that supports shift mechanism 4 side ends of an outer diameter side pinion shaft 19 and an inner diameter side pinion shaft 20 of the outer diameter side pinion 13 and the inner diameter side pinion 14, and a second carrier plate 18 that supports the other ends of the outer diameter side pinion shaft 19 and the inner diameter side pinion shaft 20.

On the inner surface of a carrier cylindrical section 15 on the inner diameter side of the first carrier plate 17, a spline is formed in parallel with the direction of the axis of the input shaft 2 and engaged with a spline formed on the outer peripheral surface of the input shaft 2.

A clutch drum 21 is comprised of a drum disk section 22, a drum cylinder section 23 extending from an inner diameter side end of the drum disk section 22, and a drum section 24 extending in the same direction as the drum cylinder section 23 from an outer diameter side end of the drum disk section 22.

The drum section 24 is located on the outer side of the ring gear 11, and the drum cylinder section 23 extends on the inner side of the second carrier plate 18.

On the inner diameter side of the second carrier plate 18, a spline is formed in parallel with the direction of the axis of the input shaft 2 and engaged with a spline formed on the outer peripheral surface of the drum cylinder section 23.

The drum cylinder section 23 is rotatably supported by a cylinder supporting section 25 extending from the transmission case 5 toward the carrier 12.

An annular cylinder is formed on the inner diameter side of the clutch drum 21, and a clutch piston 26 having a substantially U-shaped cross-section is fitted in the cylinder with the closed side of the U-shape being directed toward the drum disk section 22.

An outer peripheral surface of the drum cylinder section 23 on the drum disk section 22 side thereof and an inner peripheral surface of a disk protruded section 27 protruded inward from the drum disk section 22 serve as the sliding surface for the clutch piston 26.

Thus, the clutch piston 26 is able to slide relative to the clutch drum 21 in the direction of the axis of the drum cylinder section 23.

A clutch piston oil chamber 28 is formed between the clutch piston 26 and the drum disk section 22, and clutch operating oil pressure generated by an oil pump is supplied to the clutch piston oil chamber 28 via an oil passage, not shown.

A clutch urging section 31 extends from the outer peripheral edge of the clutch piston 26 toward an engaging section 34, described later.

The supply of the clutch operating oil pressure to the clutch piston oil chamber 28 causes the clutch urging section 31 to move in such a direction as to urge the engaging section 34.

A clutch hub 16 connected to the shift mechanism 4 is disposed between the drum section 24 and the ring gear 11.

Friction plates 32 engaged with a spline formed on the inner diameter side of the drum section 24 and friction plates 33 engaged with a spline formed on the outer diameter side of the clutch hub 16 are alternately arranged to form the engaging section 34. The clutch urging section 31 urges the engaging section 34, causing the alternately arranged friction plates 32 and 33 to engage with each other and connect the clutch drum 21 and the clutch hub 16 to each other.

Figure 2:
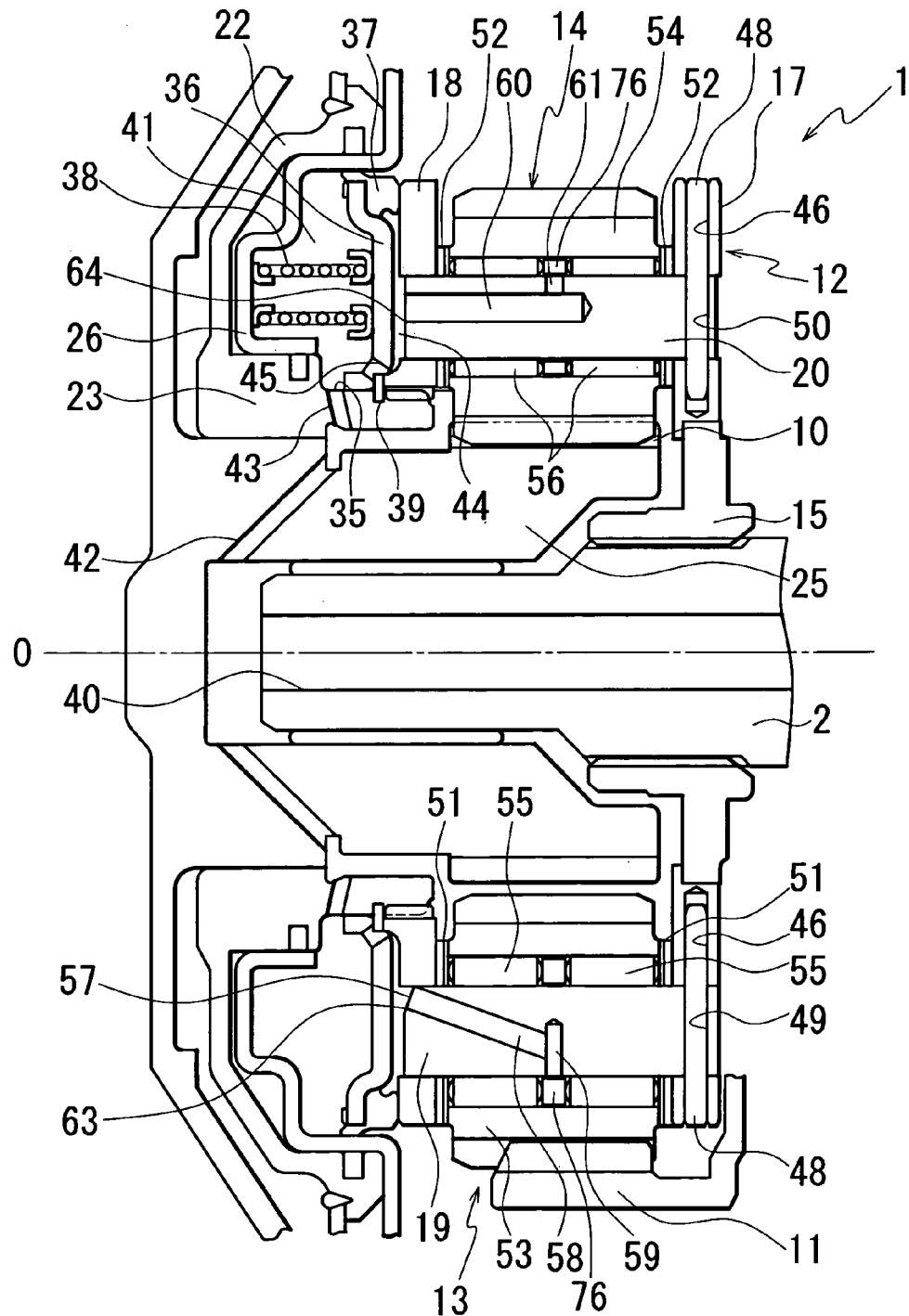
FIG. 2 is an enlarged view showing an outer diameter side pinion and an inner diameter side pinion.
Figure 3:
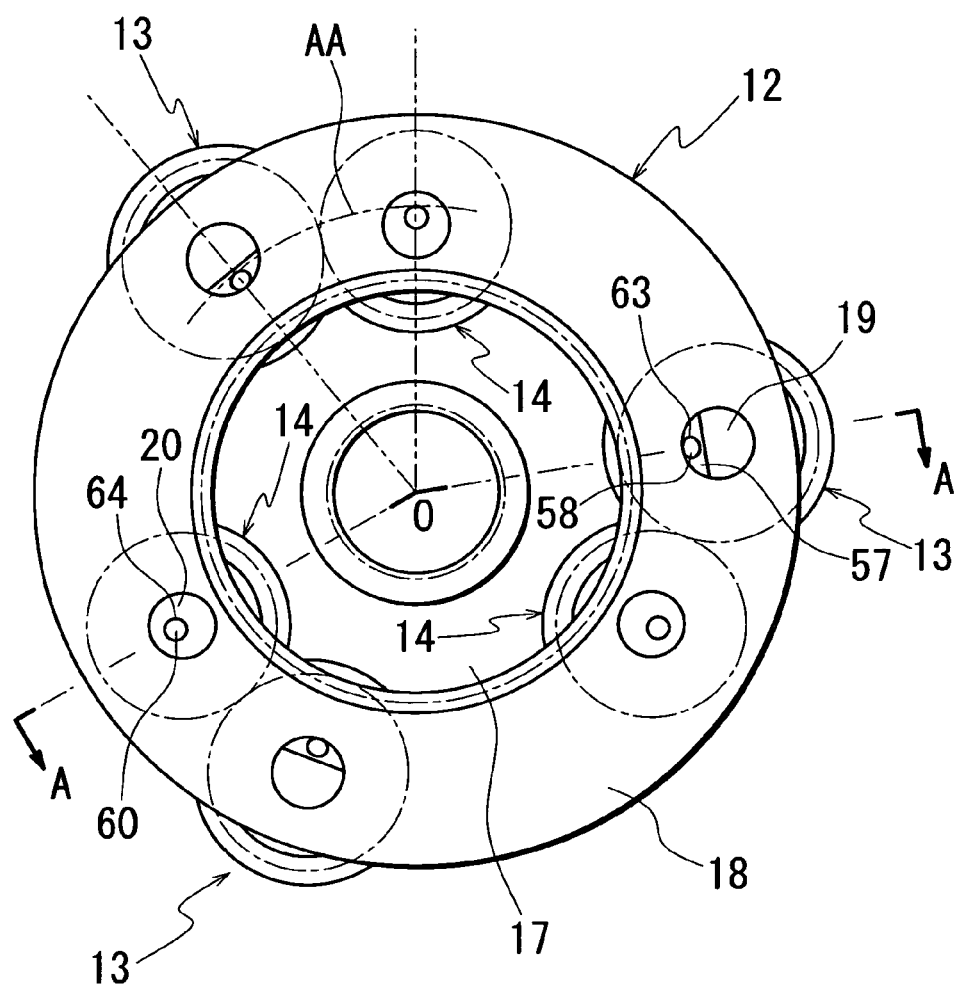
FIG. 3 is a view showing a carrier.

FIG. 2 is an enlarged view showing the outer diameter side pinion 13 and the inner diameter side pinion 14, and FIG. 3 is a view showing the carrier 12 that supports the outer diameter side pinion 13 and the inner diameter side pinion 14 as viewed from a centrifugal cancel piston side. It should be noted that FIG. 2 is a sectional view taken along line A-A in FIG. 3.

The drum cylinder section 23 is constructed such that a first outer peripheral surface 35, whose diameter is smaller than the diameter of an outer peripheral surface on the side to which the drum disk section 22 is connected, is formed on the opposite side of the side to which the drum disk section 22 is connected.

An annular centrifugal cancel piston 36 is disposed inside the clutch piston 26, and a lip seal 37 is provided on the outer peripheral edge side of the centrifugal cancel piston 36. The lip seal 37 is in sliding contact with an inner peripheral surface of the clutch piston 26 on the outer diameter side thereof, and the inner peripheral edge side of the centrifugal cancel piston 36 is in contact with the first outer peripheral surface 35.

A return spring 38 is provided between the clutch piston 26 and the centrifugal cancel piston 36. The return spring 38 forces the clutch piston 26 toward the drum disk section 22 and forces the centrifugal cancel piston 36 toward the double pinion type planetary gear mechanism 1.

A snap ring 39 is attached to the first outer peripheral surface 35 of the drum cylinder section 23, for limiting the movement of the centrifugal cancel piston 36 toward the double pinion type planetary gear mechanism 1 and the movement of the second carrier plate 18 of the double pinion type planetary gear mechanism 1 toward the centrifugal cancel piston 36.

Also, a centrifugal cancel oil chamber 41 is formed between the clutch piston 26 and the centrifugal cancel piston 36. Oil is supplied to the centrifugal cancel oil chamber 41 from a shaft oil passage 40 of the input shaft 2 via a cylindrical supporting section oil passage 42 formed in the cylinder supporting section 25 and a drum cylinder section oil passage 43 formed in the drum cylinder section 23.

The lip seal 37 is in contact with an inner peripheral surface of the clutch piston 26 and a side face of the second carrier plate 18, for keeping the centrifugal cancel oil chamber 41 airtight.

The centrifugal cancel piston 36, lip seal 37, and second carrier plate 18 constitute an introducing section 44.

It should be noted that even in the case where the carrier 12 is moved in the axial direction, the introducing section 44 can be kept sealed because the lip seal 37 is flexible.

A plurality of holes 45 are formed at predetermined intervals in the circumferential direction on the inner diameter side of the centrifugal cancel piston 36.

Oil in the centrifugal cancel oil chamber 41 is introduced into the introducing section 44 through the holes 45.

The outer diameter side pinion shaft 19 and the inner diameter side pinion shaft 20 are supported by inserting both ends thereof into respective holes formed in the first carrier plate 17 and the second carrier plate 18.

The first carrier plate 17 is formed with pin holes 46 directed inward from the outer peripheral side and passing through the holes into which the outer diameter side pinion shaft 19 and the inner diameter side pinion shaft 20 are inserted.

At ends of the outer diameter side pinion shaft 19 and the inner diameter side pinion shaft 20, which are supported by the first carrier plate 17, shaft pin holes 49 and 50 are formed vertically to the directions of the axes of the respective shafts 19 and 20.

In the state in which the outer diameter side pinion shaft 19 and the inner diameter side pinion shaft 20 are supported by the first carrier plate 17 and the second carrier plate 18, the shaft pin holes 49 and 50 are aligned with the respective pin holes 46 of the first carrier plate 17 and then fall-off preventive pins 48 are inserted into the aligned holes to thereby prevent the outer diameter side pinion shaft 19 and the inner diameter side pinion shaft 20 from falling off.

Washers 51 passed through the outer diameter side pinion shaft 19 is provided between a gear section 53 of the outer diameter side pinion 13 and the first carrier plate 17 as well as the first carrier plate 17 and the second carrier plate 18 so that the outer diameter side pinion 13 can rotate smoothly.

Similarly, Washers 52 is provided between a gear section 54 of the inner diameter side pinion 14 and the first carrier plate 17 as well as the first carrier plate 17 and the second carrier plate 18.

Two needle bearings 55 are fitted in the outer diameter side pinion shaft 19, and the gear section 53 is fitted on an outer periphery of the needle bearings 55. A positioning washer 76 is interposed between the two needle bearings 55, for positioning the needle bearings 55.

It should be noted that the inner diameter of the positioning washer 76 is larger than the diameter of the inner diameter side pinion shaft 20, and the outer diameter of the positioning washer 76 is smaller than the inner diameter of the gear section 54.

The outer diameter side pinion shaft 19 is fixed relative to the first carrier plate 17 and the second carrier plate 18, and the gear section 53 is rotatable relative to the first carrier plate 17 and the second carrier plate 18.

Similarly, two needle bearings 56 and the positioning washer 76 are fitted in the inner diameter side pinion shaft 20, and the gear section 54 is fitted on an outer periphery of the needle bearings 56. The inner diameter side pinion shaft 20 is fixed relative to the first carrier plate 17 and the second carrier plate 18, and the gear section 54 is rotatable relative to the first carrier plate 17 and the second carrier plate 18.

At an end of the outer diameter side pinion shaft 19 on the centrifugal cancel piston 36 side, a corner closer to the center of the carrier 12 is chipped off to form an inclined section 57.

In substantially the central part of the outer diameter side pinion shaft 19 in the direction of the length thereof, a lubricating oil supplying hole 59 with a length nearly equal to the radius of the outer diameter side pinion shaft 19 extends from the outer diameter side to the inner diameter side of the carrier 12.

Also, a lubricating oil introducing hole 58 extending from the inclined section 57 to the lubricating oil supplying hole 58 is formed in the outer diameter side pinion shaft 19.

It should be noted that the inclined section 57 is provided so that the lubricating oil introducing hole 58 can be easily formed diagonally to the direction of the axis of the outer diameter side pinion shaft 19.

On the other hand, a lubricating oil introducing hole 60 which is half the length of the inner diameter side pinion shaft 20 extends from an end face of the inner diameter side pinion shaft 20 on the centrifugal cancel piston 36 side and in parallel with the axis of the inner diameter side pinion shaft 20.

Also, a lubricating oil supplying hole 61 extending from the outer peripheral surface of the carrier 12 on the outer diameter side thereof to the lubricating oil introducing hole 60 is formed in substantially the central part of the inner diameter side pinion shaft 20 in the direction of the length thereof.

It should be noted that the lubricating oil introducing hole 60 formed in the inner diameter side pinion shaft 20 is out of alignment with the axis of the inner diameter side pinion shaft 20 toward the outer side of the carrier 12.

The lubricating oil introducing holes 58 and 60 are formed such that the distance from an axis O of the carrier 12 to the outermost edge of an opening 63 in the direction of the carrier 12's diameter in the lubricating oil introducing hole 58 formed in the outer diameter side pinion shaft 19 and the distance from the axis O of the carrier 12 to the outermost edge of an opening 64 in the direction of the carrier 12's diameter in the lubricating oil introducing hole 60 formed in the inner diameter side pinion shaft 20 are equal to each other.

Next, a description will be given of the flow of lubricating oil that lubricates the carrier 12 of the double pinion type planetary gear mechanism 1.

Oil from the shaft oil passage 40 of the input shaft 2 flows into the centrifugal cancel oil chamber 41 through the cylinder supporting section oil passage 42 and the drum cylinder section oil passage 43. The oil in the centrifugal cancel oil chamber 41 flows into the introducing section 44 through the holes 45 formed in the centrifugal cancel piston 36.

The oil having flowed into the introducing section 44 is supplied as lubricating oil for the carrier 12 to the needle bearings 55 through the lubricating oil introducing hole 58 and the lubricating oil supplying hole 59 formed in the outer diameter side pinion shaft 19, as well as to the needle bearings 56 through the lubricating oil introducing hole 60 and the lubricating oil supplying hole 61 formed in the inner diameter side pinion shaft 20 at the same time so as to lubricate the needle bearings 55 and 56.

The lubricating oil supplied to the needle bearings 55 of the outer diameter side pinion shaft 19 and the needle bearings 56 of the inner diameter side pinion shaft 20 spreads in the directions of the axes of the shafts 19 and 20, so that the oil is supplied to the washers 51 and 52 to lubricate them.

It should be noted that as indicated by the line A-A in FIG. 3, the distance from the axis O of the carrier 12 to the outermost edge of the opening 63 in the direction of the carrier 12's diameter in the lubricating oil introducing hole 58 formed in the outer diameter side pinion shaft 19 and the distance from the axis O of the carrier 12 to the outermost edge of the opening 64 in the direction of the carrier 12's diameter in the lubricating oil introducing hole 60 formed in the inner diameter side pinion shaft 20 are equal to each other. Therefore, lubricating oil can be introduced into the lubricating oil introducing hole 60 of the inner diameter side pinion shaft 20 irrespective of the amount of lubricating oil that can be supplied through the lubricating oil introducing hole 58.

In the present embodiment, the lubricating oil introducing hole 60 formed in the inner diameter side pinion shaft 20 constitutes an inner diameter side lubricating oil introducing hole of the present invention, and the lubricating oil introducing hole 58 formed in the outer diameter side pinion shaft 19 constitutes an outer diameter side lubricating oil introducing hole of the present invention. The lip seal 37 constitutes a sealing member of the present invention.

According to the present invention constructed as described above, the lubricating oil introducing hole 58 and the lubricating oil introducing hole 60 are formed such that the distance from the axis O of the carrier 12 to the outermost edge of the opening 63 in the direction of the carrier 12's diameter in the lubricating oil introducing hole 58 formed in the outer diameter side pinion shaft 19 and the distance from the axis O of the carrier 12 to the outermost edge of the opening 64 in the direction of the carrier 12's diameter in the lubricating oil introducing hole 60 formed in the inner diameter side pinion shaft 20 are equal to each other.

Therefore, lubricating oil can be introduced into the lubricating oil introducing hole 60 of the inner diameter side pinion shaft 20 irrespective of the amount of lubricating oil that can be supplied through the lubricating hole introducing hole 58. This improves the durability of the bearing section of the inner diameter side pinion shaft 20.

Further, since it is unnecessary to provide respective introducing sections for lubricating oil to be supplied to the outer diameter side pinion shaft 19 and the inner diameter side pinion shaft 20, it is possible to simplify the shape of the centrifugal cancel piston 36 conforming to the outer diameter side of the introducing section 44 and to increase the degree of design freedom.

Further, since the centrifugal cancel piston 36 is used as the oil catch plate that supplies lubricating oil to the outer diameter side pinion shaft 19 and the inner diameter side pinion shaft 20, the axial dimension can be reduced as compared in the case where an oil catch plate and a centrifugal cancel piston are separately provided.

Further, even in the case where the carrier 12 moves in the axial direction in accordance with the direction of input torque to change the relative positions of the carrier 12 and the centrifugal cancel piston 36, the introducing section 44 can be kept sealed because the lip seal 37 is flexible, and therefore, lubricating oil can be surely supplied to the outer diameter side pinion shaft 19 and the inner diameter side pinion shaft 20.

Further, since the lubricating oil introducing hole 60 formed in the inner diameter side pinion shaft 20 is out of alignment with the axis of the shaft 20 toward the outer diameter of the carrier 12, it is unnecessary to form a lubricating oil introducing hole by, for example, machining the second carrier plate 18 so that the distance from the axis O of the carrier 12 to the outermost edge of the opening 63 in the direction of the carrier 12's diameter in the lubricating oil introducing hole 58 and the distance from the axis O of the carrier 12 to the outermost edge of the opening 64 in the direction of the carrier 12's diameter in the lubricating oil introducing hole 60 can be equal to each other.

As a result, it is possible to reduce the number of manufacturing steps and to suppress the formation of burrs caused by the number of manufacturing steps decrease.

A description will now be given of a first variation.

Figure 4:
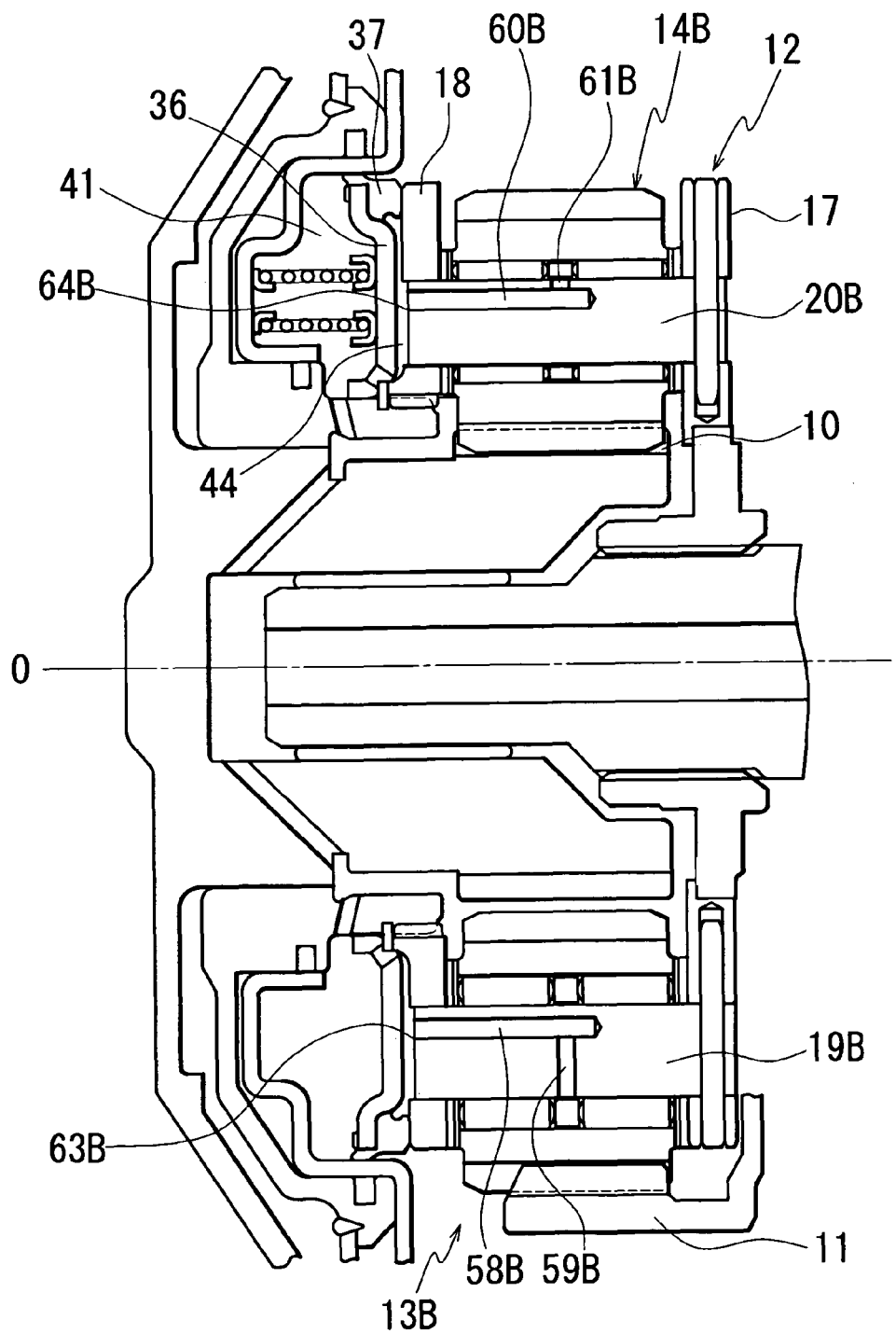
FIG. 4 is an enlarged view showing an outer diameter side pinion and an inner diameter side pinion according to a first variation.
Figure 5:
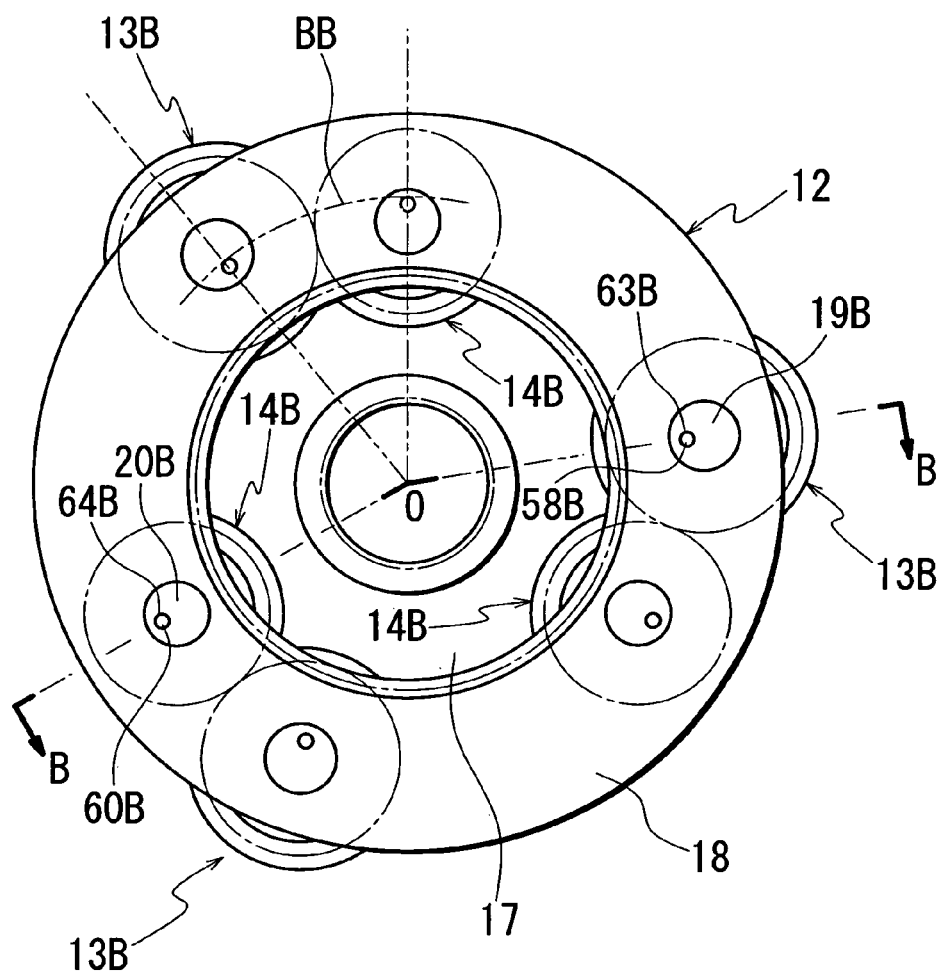
FIG. 5 is a view showing a carrier according to the first variation.

FIG. 4 is an enlarged view showing an outer diameter side pinion and an inner diameter side pinion, and FIG. 5 is a view showing a carrier that supports the outer diameter side pinion and the inner diameter side pinion as viewed from a centrifugal cancel piston side. It should be noted that FIG. 4 is a sectional view taken along line B-B in FIG. 5.

A double pinion type planetary gear mechanism according to the first variation is comprised of an outer diameter side pinion 13B that is engaged with the ring gear 11, an inner diameter side pinion 14B that is engaged with the sun gear 10, and the carrier 12 that rotatably supports the outer diameter side pinion 13B and the inner diameter side pinion 14B.

The outer diameter side pinion 13B and the inner diameter side pinion 14B are engaged with each other.

In an inner diameter side pinion shaft 20B, a lubricating oil introducing hole 60B which is half the length of the inner diameter side pinion shaft 20B extends from an end face of the inner diameter side pinion shaft 20B on the centrifugal cancel piston 36 side and in parallel with the axis of the inner diameter side pinion shaft 20B.

Also, a lubricating oil supplying hole 61B extending from the outer peripheral surface of the carrier 12 on the outer diameter side thereof to the lubricating oil introducing hole 60B is formed in substantially the central part of the inner diameter side pinion shaft 20B in the direction of the length thereof.

In an outer diameter side pinion shaft 19B, a lubricating oil introducing hole 58B which is half the length of the outer diameter side pinion shaft 19B is formed in a manner extending from an end face of the outer diameter side pinion shaft 19B on the centrifugal cancel piston 36 side and in parallel with the axis of the outer diameter side pinion shaft 19B.

Also, a lubricating oil supplying hole 59B extending from the outer diameter side to the inner diameter side of the carrier 12 is formed in substantially the central part of the outer diameter side pinion shaft 19B in the direction of the length thereof.

As indicated by the line B-B in FIG. 5, the lubricating oil introducing holes 58B and 60B are formed such that the distance from the axis O of the carrier 12 to the outermost edge of an opening 63B in the direction of the carrier 12's diameter in the lubricating oil introducing hole 58B formed in the outer diameter side pinions shaft 19B and the distance from the axis O of the carrier 12 to the outermost edge of an opening 64B in the direction of the carrier 12's diameter in the lubricating oil introducing hole 60B formed in the inner diameter side pinion shaft 20B are equal to each other.

The oil having flowed into the introducing section 44 from the centrifugal cancel oil chamber 41 is supplied as lubricating oil for the carrier 12 to needle bearings and washers on the outer diameter side pinion 13B side through the lubricating oil introducing hole 58B and the lubricating oil supplying hole 59B, which are formed in the outer diameter side pinion shaft 19B, as well as to needle bearings and washers on the inner diameter side pinion 14B side through the lubricating oil introducing hole 60B and the lubricating oil supplying hole 61B formed in the inner diameter side pinion shaft 20B at the same time to lubricate the needle bearings and the washers.

The other elements and parts are the same as those of the above described embodiment, and therefore they are denoted by the same reference numerals and description thereof is omitted.

In the present variation, the lubricating oil introducing hole 60B formed in the inner diameter side pinion shaft 20B constitutes an inner diameter side lubricating oil introducing hole of the present invention, and the lubricating oil introducing hole 58B formed in the outer diameter side pinion shaft 19B constitutes an outer diameter side lubricating oil introducing hole of the present invention.

In the present variation, the same effects as those obtained in the above described embodiment can be obtained; i.e. lubricating oil can be supplied to the inner diameter side pinion shaft 20B irrespective of the amount of lubricating oil that can be supplied to the outer diameter side pinion shaft 19B, and the shape of the centrifugal cancel piston 36 conforming to the outer side of the introducing section 44 can be simplified.

A description will now be given of a second variation.

Figure 6:
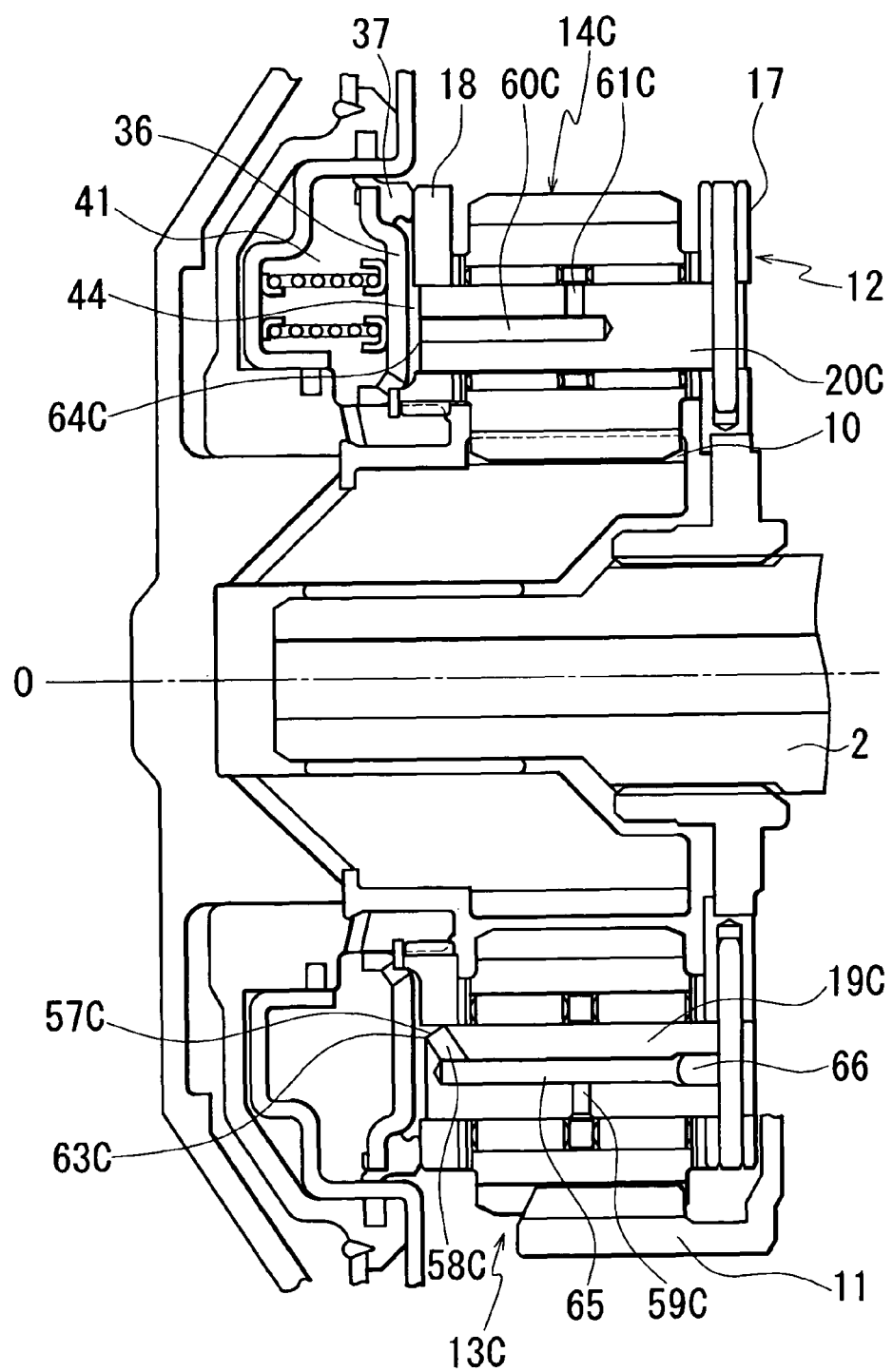
FIG. 6 is an enlarged view showing an outer diameter side pinion and an inner diameter side pinion according to a second variation.
Figure 7:
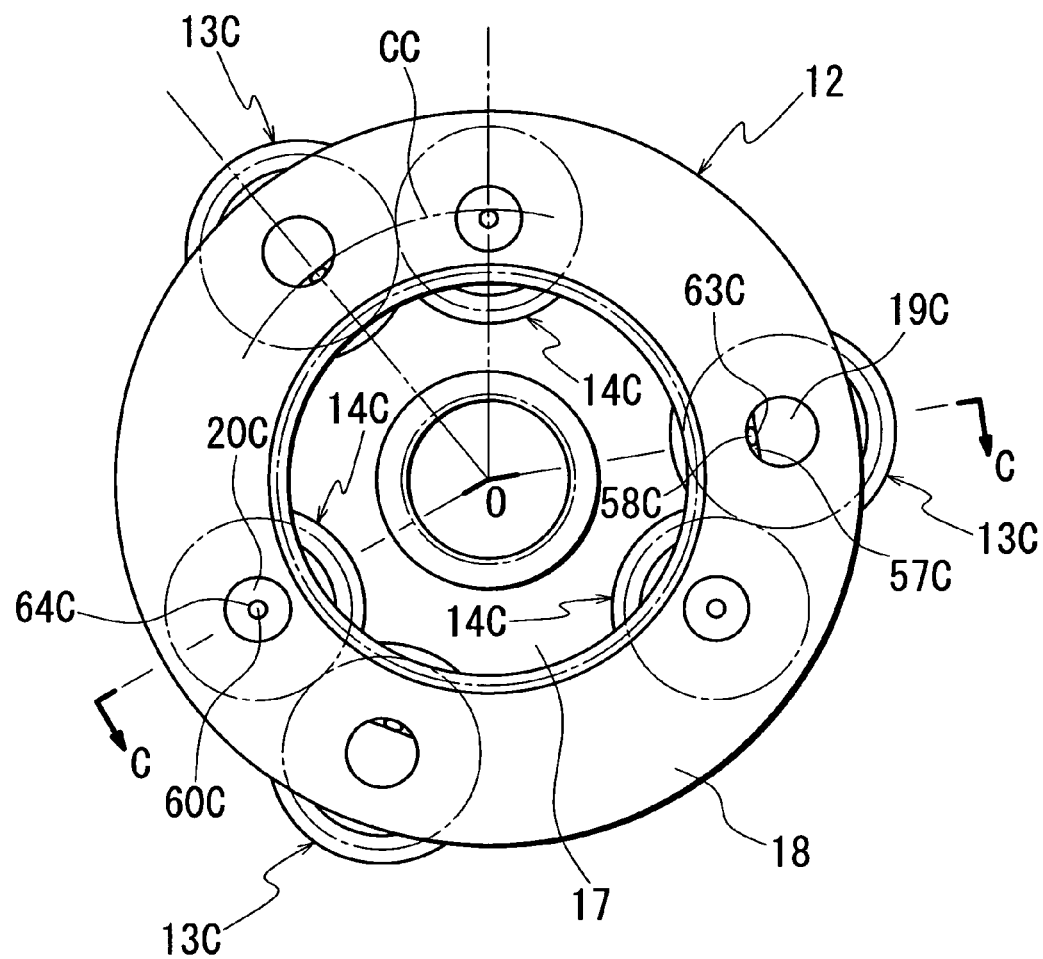
FIG. 7 is a view showing a carrier according to the second variation.

FIG. 6 is an enlarged view showing an outer diameter side pinion and an inner diameter side pinion, and FIG. 7 is a view showing a carrier that supports the outer diameter side pinion and the inner diameter side pinion as viewed from a centrifugal cancel piston side. It should be noted that FIG. 6 is a sectional view taken along line C-C in FIG. 7.

A double pinion type planetary gear mechanism according to the second variation is comprised of an outer diameter side pinion 13C that is engaged with the ring gear 11, an inner diameter side pinion 14C that is engaged with the sun gear 10, and the carrier 12 that rotatably supports the outer diameter side pinion 13C and the inner diameter side pinion 14C.

The outer diameter side pinion 13C and the inner diameter side pinion 14C are engaged with each other.

In an inner diameter side pinion shaft 20C, a lubricating oil introducing hole 60C which is half the length of the inner diameter side pinion shaft 20C is formed in a manner extending from an end face of the inner diameter side pinion shaft 20C on the centrifugal cancel piston 36 side and in parallel with the axis of the inner diameter side pinion shaft 20C.

The lubricating oil introducing hole 60C is formed on the axis of the inner diameter side pinion shaft 20C.

Also, a lubricating oil supplying hole 61C extending from an outer peripheral surface on the outer side of the carrier 12 to the lubricating oil introducing hole 60C is formed in substantially the central part of the inner diameter side pinion shaft 20C in the direction of the length thereof.

In an outer diameter side pinion shaft 19C, an in-shaft oil passage 65 slightly shorter than the shaft 19C extends from an end face on the first carrier plate 17 side to the axis of the shaft 19C, and an opening thereof on the first carrier plate 17 is closed up by a plug 66.

In substantially the central part of the outer diameter side pinion shaft 19C in the direction of the length thereof, a lubricating oil supplying hole 59C is formed in a manner extending from the outer side of the carrier 12 to the in-shaft oil passage 65.

At an end of the outer diameter side pinion shaft 19C on the centrifugal cancel piston 36 side, a corner closer to the center of the carrier 12 is chipped off to form an inclined section 57C.

Further, the outer diameter side pinion shaft 19C is formed with a lubricating oil introducing hole 58C extending from the inclined section 57C to the in-shaft oil passage 65.

As indicated by the line C-C in FIG. 7, the lubricating oil introducing holes 58C and 60C are formed such that the distance from the axis O of the carrier 12 to the outermost edge of an opening 63C in the direction of the carrier 12's diameter in the lubricating oil introducing hole 58C formed in the outer diameter side pinions shaft 19C and the distance from the axis O of the carrier 12 to the outermost edge of an opening 64C in the direction of the carrier 12's diameter in the lubricating oil introducing hole 60C formed in the inner diameter side pinion shaft 20C are equal to each other.

The oil having flowed into the introducing section 44 from the centrifugal cancel oil chamber 41 is supplied as lubricating oil for the carrier 12 to needle bearings and washers on the outer diameter side pinion 13C side through the lubricating oil introducing hole 58C, in-shaft oil passage 65, and lubricating oil supplying hole 59C formed in the outer diameter side pinion shaft 19C, as well as to needle bearings and washers on the inner diameter side pinion 14C side through the lubricating oil introducing hole 60C and the lubricating oil supplying hole 61C formed in the inner diameter side pinion shaft 20C at the same time to lubricate the needle bearings and the washers.

The other elements and parts are the same as those of the above described embodiment, and therefore they are denoted by the same reference numerals and description thereof is omitted.

In the present variation, the lubricating oil introducing hole 60C formed in the inner diameter side pinion shaft 20C constitutes an inner diameter side lubricating oil introducing hole of the present invention, and the lubricating oil introducing hole 58C formed in the outer diameter side pinion shaft 19C constitutes an outer diameter side lubricating oil introducing hole of the present invention.

In the present variation, the same effects as those obtained in the above described embodiment can be obtained; i.e. lubricating oil can be supplied to the inner diameter side pinion shaft 20C irrespective of the amount of lubricating oil that can be supplied to the outer diameter side pinion shaft 19C, and the shape of the centrifugal cancel piston 36 conforming to the outer side of the introducing section 44 can be simplified.

A description will now be given of a third variation.

Figure 8:
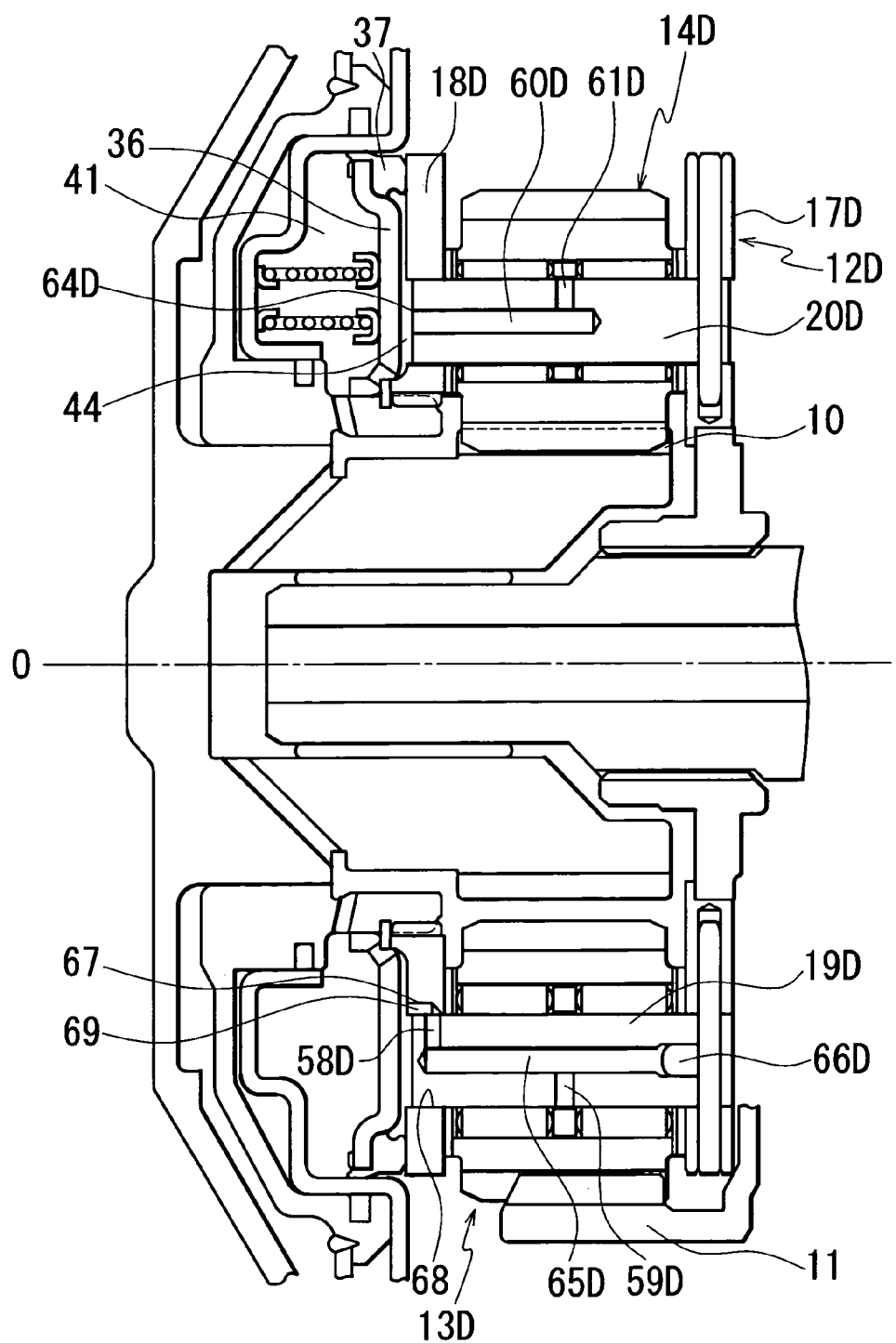
FIG. 8 is an enlarged view showing an outer diameter side pinion and an inner diameter side pinion according to a third variation.
Figure 9:
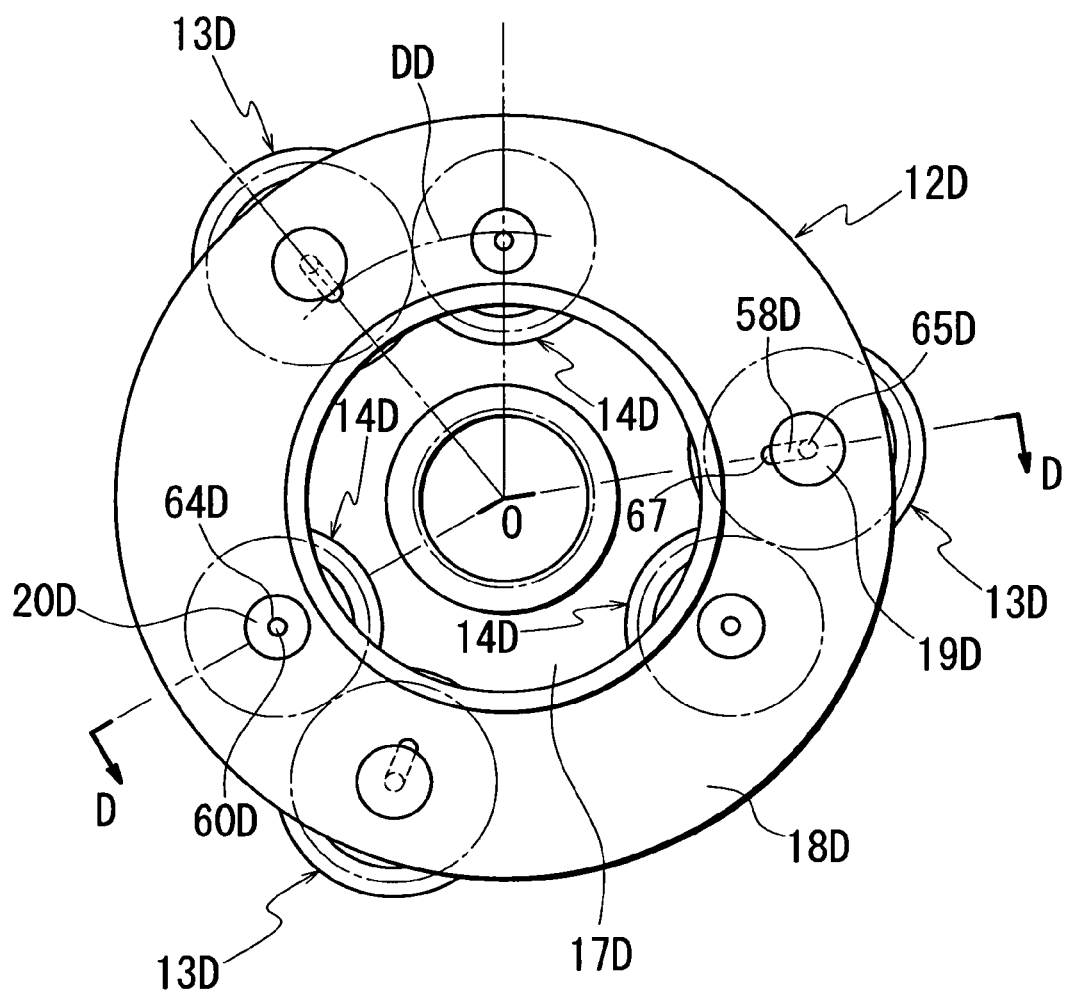
FIG. 9 is a view showing a carrier according to the third variation.

FIG. 8 is an enlarged view showing an outer diameter side pinion and an inner diameter side pinion, and FIG. 9 is a view showing a carrier that supports the outer diameter side pinion and the inner diameter side pinion as viewed from a centrifugal cancel piston side. It should be noted that FIG. 8 is a sectional view taken along line D-D in FIG. 9.

A double pinion type planetary gear mechanism according to the third variation is comprised of an outer diameter side pinion 13D that is engaged with the ring gear 11, an inner diameter side pinion 14D that is engaged with the sun gear 10, and a carrier 12D that rotatably supports the outer diameter side pinion 13D and the inner diameter side pinion 14D.

The outer diameter side pinion 13D and the inner diameter side pinion 14D are engaged with each other.

The carrier 12D is comprised of a second carrier plate 18D that supports ends of the shafts 19D and 20D on the centrifugal cancel piston 36 side thereof, and a first carrier plate 17D that supports the other ends of the shafts 19D and 20D.

In an inner diameter side pinion shaft 20D, a lubricating oil introducing hole 60D which is half the length of the inner diameter side pinion shaft 20D extends from an end face of the inner diameter side pinion shaft 20D on the centrifugal cancel piston 36 side and in parallel with the axis of the inner diameter side pinion shaft 20D.

The lubricating oil introducing hole 60D is formed on the axis of the inner diameter side pinion shaft 20D.

Also, a lubricating oil supplying hole 61D extending from the outer peripheral surface of the carrier 12D on the outer diameter side thereof to the lubricating oil introducing hole 60D is formed in substantially the central part of the inner diameter side pinion shaft 20D in the direction of the length thereof.

In an outer diameter side pinion shaft 19D, an in-shaft oil passage 65D slightly shorter than the shaft 19D is formed in a manner extending from an end face on the first carrier plate 17D side to the axis of the shaft 19D, and an opening thereof on the first carrier plate 17D is closed up by a plug 66D.

In substantially the central part of the outer diameter side pinion shaft 19D in the direction of the length thereof, a lubricating oil supplying hole 59D extends from the outer side of the carrier 12D to the in-shaft oil passage 65D.

At an end of the outer diameter side pinion shaft 19D on the centrifugal cancel piston 36 side, a lubricating oil introducing hole 58D extends from an outer peripheral surface on the inner diameter side of the carrier 12D to the in-shaft oil passage 65D.

In a supporting hole 68 of the second carrier plate 18D into which the outer diameter side pinion shaft 19D of the outer diameter side pinion 13D is inserted, an inner peripheral surface on the inner diameter side of the carrier 12 is cut from the centrifugal cancel piston 36 side to a location substantially half the thickness of the second carrier plate 18D to form a carrier cut section 67.

In the state in which the outer diameter side pinion shaft 19D is fitted in the supporting hole 68 of the second carrier plate 18D, the outer peripheral surface of the outer diameter side pinion shaft 19D and the carrier cut section 67 form a carrier oil passage 69, which is in communication with the lubricating oil introducing hole 58D.

As indicated by the line D-D in FIG. 9, the carrier oil passage 69 and the lubricating oil introducing hole 60D are formed such that the distance from the axis O of the carrier 12D to the outermost edge of an opening 63C in the direction of the carrier 12D's diameter in the carrier oil passage 69 and the distance from the axis O of the carrier 12D to the outermost edge of an opening 64D in the direction of the carrier 12D's diameter in the lubricating oil introducing hole 60D formed in the inner diameter side pinion shaft 20D are equal to each other.

The oil having flowed into the introducing section 44 from the centrifugal cancel oil chamber 41 is supplied as lubricating oil for the carrier 12D to needle bearings and washers on the outer diameter side pinion 13D side through the carrier oil passage 69, lubricating oil introducing hole 58D, in-shaft oil passage 65D, and lubricating oil supplying hole 59D, as well as to needle bearings and washers on the inner diameter side pinion 14D side through the lubricating oil introducing hole 60D and the lubricating oil supplying hole 61D formed in the inner diameter side pinion shaft 20D at the same time to lubricate the needle bearings and the washers.

The other elements and parts are the same as those of the above described embodiment, and therefore they are denoted by the same reference numerals and description thereof is omitted.

In the present variation, the lubricating oil introducing hole 60D formed in the inner diameter side pinion shaft 20D constitutes an inner diameter side lubricating oil introducing hole of the present invention, and the carrier oil passage 69 constitutes an outer side lubricating oil introducing hole of the present invention.

In the present variation, the same effects as those obtained in the above described embodiment can be obtained; i.e. lubricating oil can be supplied to the inner diameter side pinion shaft 20D irrespective of the amount of lubricating oil that can be supplied to the outer diameter side pinion shaft 19D, and the shape of the centrifugal cancel piston 36 conforming to the outer side of the introducing section 44 can be simplified.

A description will now be given of a fourth variation.

Figure 10:
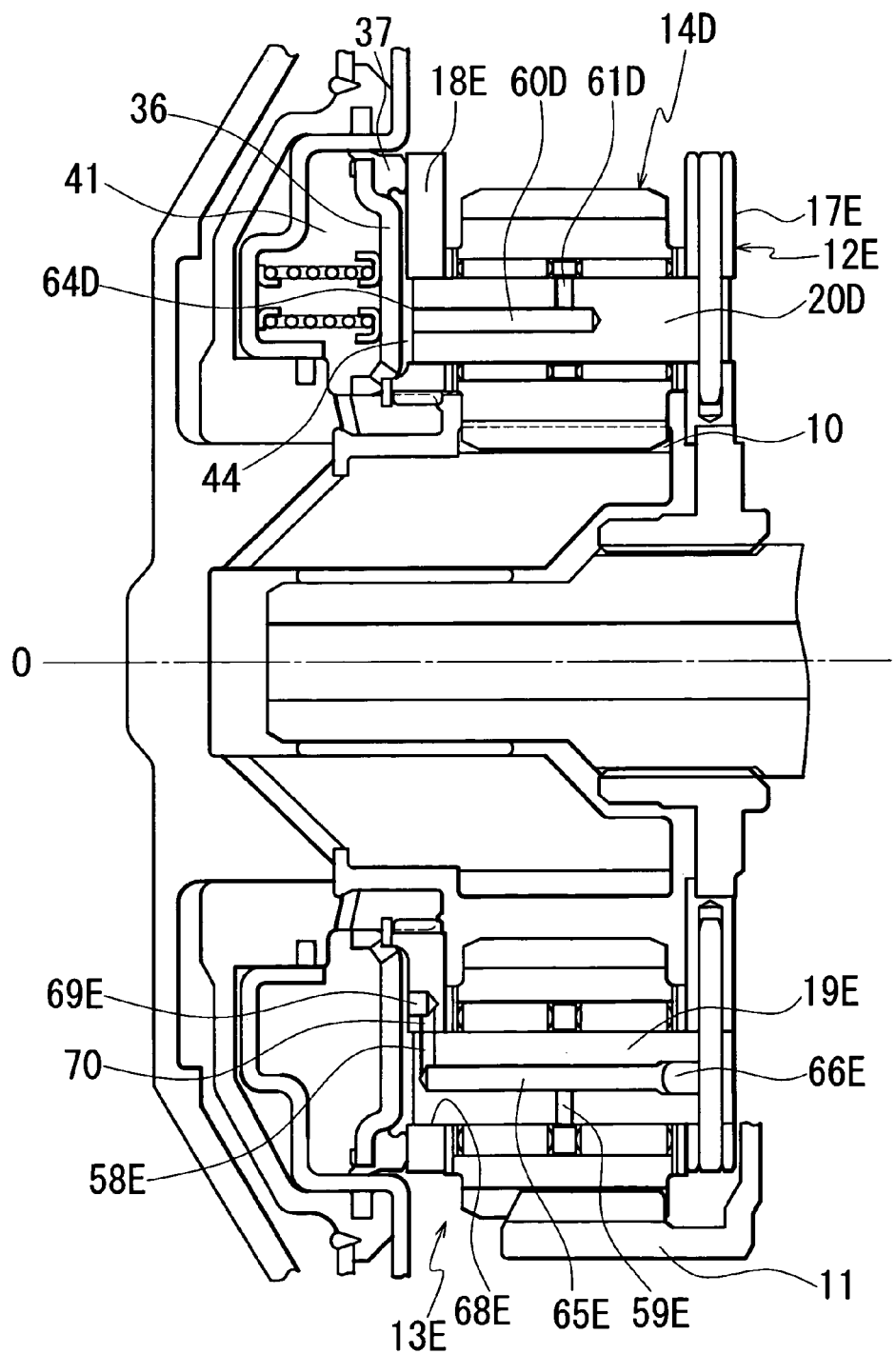
FIG. 10 is an enlarged view showing an outer diameter side pinion and an inner diameter side pinion according to a fourth variation.
Figure 11:
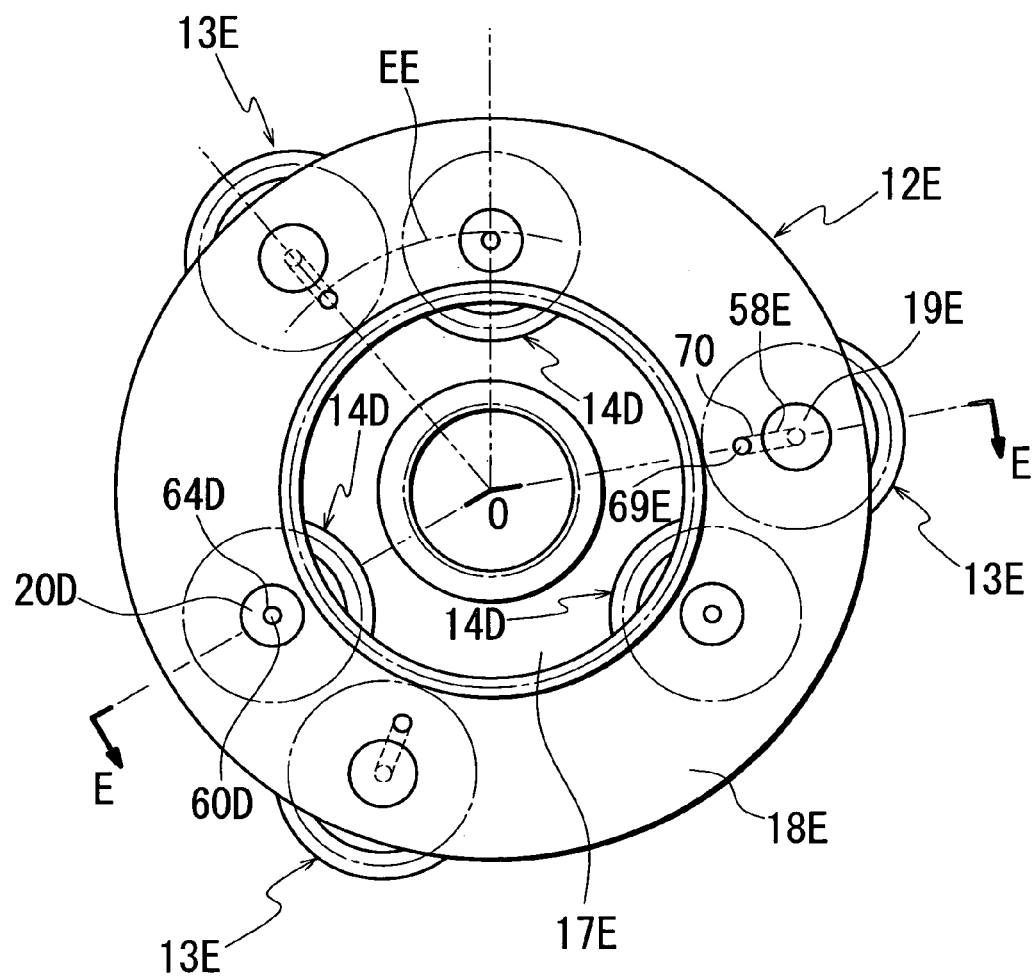
FIG. 11 is a view showing a carrier according to the fourth variation.

FIG. 10 is an enlarged view showing an outer diameter side pinion and an inner diameter side pinion, and FIG. 11 is a view showing a carrier that supports the outer diameter side pinion and the inner diameter side pinion as viewed from a centrifugal cancel piston side. It should be noted that FIG. 10 is a sectional view taken along line E-E in FIG. 11.

The inner diameter side pinion 14D according to the fourth variation is the same as the one in the third variation, and therefore it is denoted by the same reference numeral and description thereof is omitted.

A carrier 12E that supports the outer diameter side pinion 13E and the inner diameter side pinion 14D is comprised of a first carrier plate 17E and a second carrier plate 18E.

In an outer diameter side pinion shaft 19E, an in-shaft oil passage 65E slightly shorter than the shaft 19E is formed in a manner extending from an end face on the first carrier plate 17E side to the axis of the shaft 19E, and an opening thereof on the first carrier plate 17E side is closed up by a plug 66E.

In substantially the central part of the outer diameter side pinion shaft 19E in the direction of the length thereof, a lubricating oil supplying hole 59E extends from the outer side of the carrier 12E to the in-shaft oil passage 65E.

At an end of the outer diameter side pinion shaft 19E on the centrifugal cancel piston 36 side, a lubricating oil introducing hole 58E extends from an outer peripheral surface on the inner diameter side of the carrier 12E to the in-shaft oil passage 65E.

In the second carrier plate 18E, a carrier oil passage 69E with a depth nearly half the thickness of the second carrier plate 18E extends from the surface on the centrifugal cancel piston 36 side.

In a supporting hole 68E of the second carrier plate 18E into which the outer diameter side pinion shaft 19E of the outer diameter side pinion 13E is inserted, a carrier oil passage 70 extends from an inner peripheral surface of the supporting hole 68E on the inner diameter side of the carrier 12E to the carrier oil passage 69E.

In the state in which the outer diameter side pinion shaft 19E of the outer diameter side pinion 13E is fitted in the supporting hole 68E of the second carrier plate 18E, the carrier oil passage 70 is in communication with the lubricating oil introducing hole 58E.

As indicated by the line E-E in FIG. 11, the carrier oil passage 69E and the lubricating oil introducing hole 60D are formed such that the distance from the axis O of the carrier 12E to the outermost edge of the carrier oil passage 69E in the direction of the carrier 12E's diameter and the distance from the axis O of the carrier 12E to the outermost edge of the opening 64D in the direction of the carrier 12E's diameter in the lubricating oil introducing hole 60D formed in the inner diameter side pinion shaft 20D are equal to each other.

The oil having flowed into the introducing section 44 from the centrifugal cancel oil chamber 41 is supplied as lubricating oil for the carrier 12E to needle bearings and washers on the outer diameter side pinion 13E side through the carrier oil passage 69E, carrier oil passage 70, lubricating oil introducing hole 58E, in-shaft oil passage 65E, and lubricating oil supplying hole 59E, as well as to needle bearings and washers on the inner diameter side pinion 14D side through the lubricating oil introducing hole 60D and the lubricating oil supplying hole 61D formed in the inner diameter side pinion shaft 20D at the same time to lubricate the needle bearings and the washers.

In the present variation, the lubricating oil introducing hole 60D formed in the inner diameter side pinion shaft 20D constitutes an inner diameter side lubricating oil introducing hole of the present invention, and the carrier oil passage 69E constitutes an outer diameter side lubricating oil introducing hole of the present invention.

In the present variation, the same effects as those obtained in the above described embodiment can be obtained; i.e. lubricating oil can be supplied to the inner diameter side pinion shaft 20D irrespective of the amount of lubricating oil that can be supplied to the outer diameter side pinion shaft 19E, and the shape of the centrifugal cancel piston 36 conforming to the outer side of the introducing section 44 can e simplified.

A description will now be given of a fifth variation.

Figure 12:
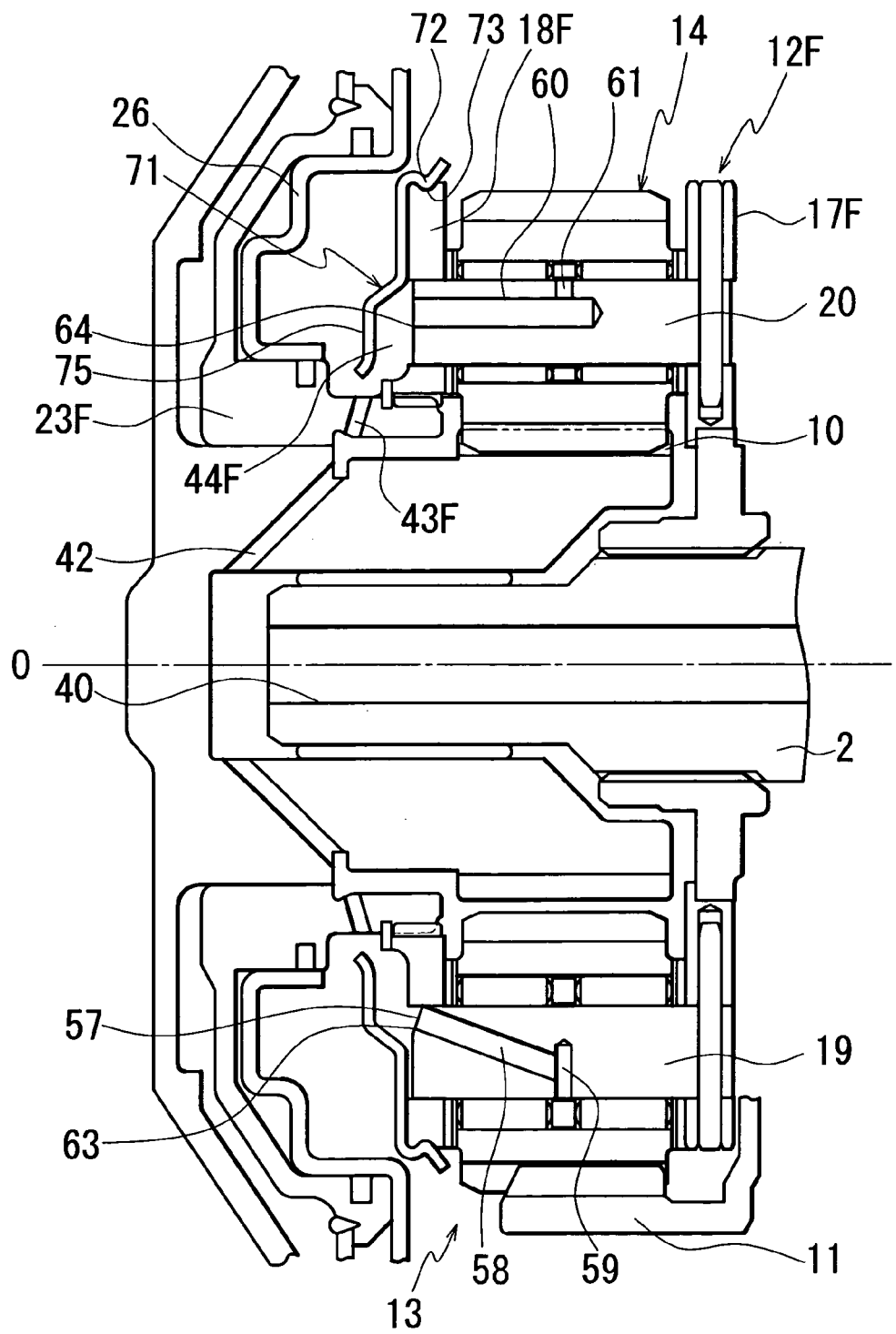
FIG. 12 is an enlarged view showing an outer diameter side pinion and an inner diameter side pinion according to a fifth variation.
Figure 13:
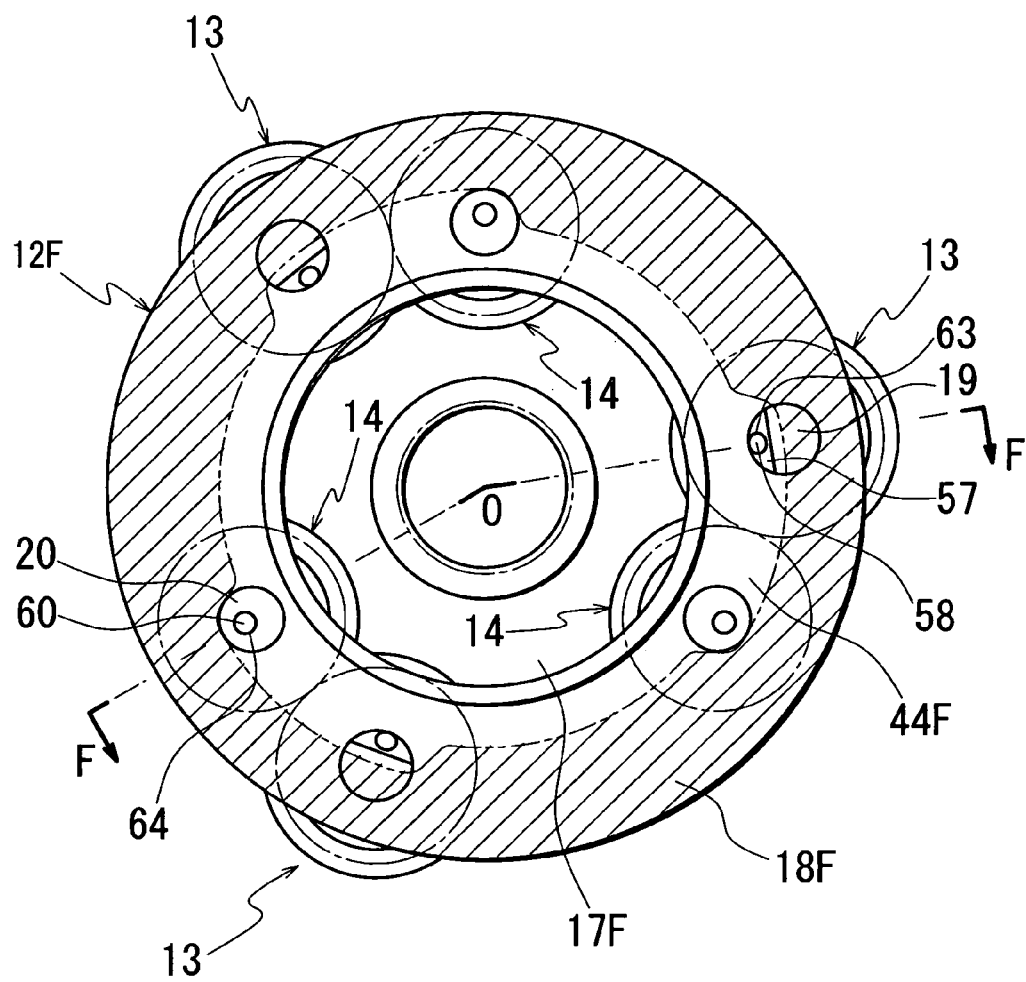
FIG. 13 is a view showing a carrier according to the fifth variation.

FIG. 12 is an enlarged view showing an outer diameter side pinion and an inner diameter side pinion, and FIG. 13 is a view showing a carrier that supports the outer diameter side pinion and the inner diameter side pinion as viewed from a centrifugal cancel piston side. It should be noted that FIG. 12 is a sectional view taken along line F-F in FIG. 13.

In the fifth variation, an oil catch plate 71 is used in place of the centrifugal cancel piston 36 in the above described embodiment. Parts and elements corresponding to those of the above described embodiment are denoted by the same reference numerals, and description thereof is omitted.

Figure 14A:
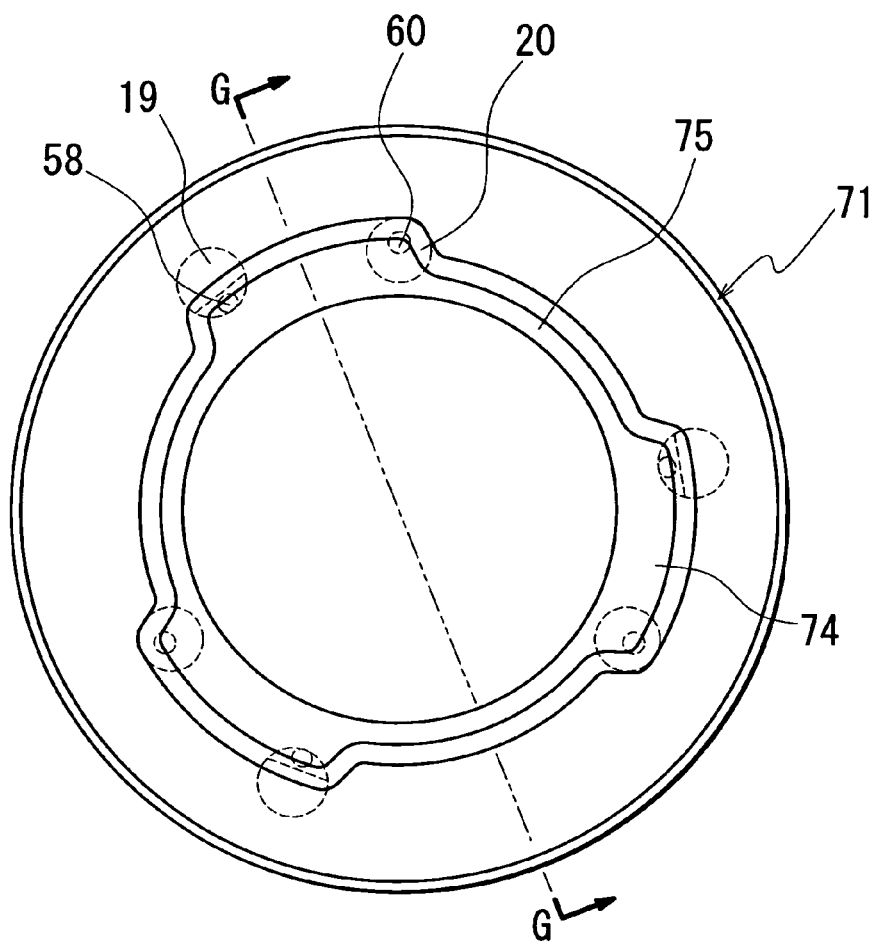
FIG. 14A is a front view showing an oil catch plate.
Figure 14B:
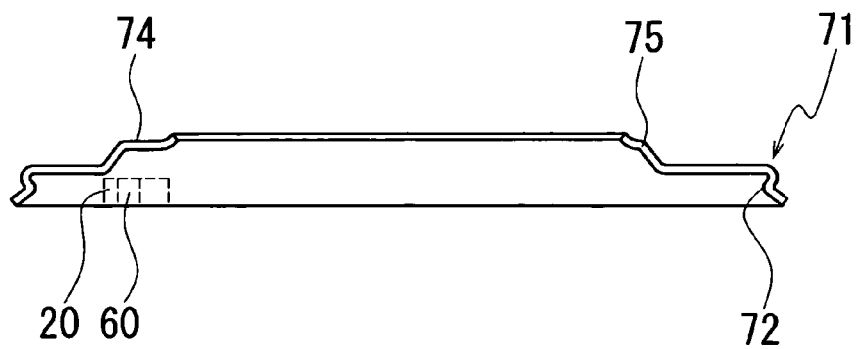
FIG. 14B is a bottom view showing an oil catch plate.

FIG. 14A is a view showing the oil catch plate 71 as viewed from the clutch piston 26 side, and FIG. 14B is a sectional view taken along line G-G in FIG. 14A.

The oil catch plate 71 is constructed such that a surface on the outer diameter side and a surface on the inner diameter side are out of alignment in parallel with each other, and a protruded section 75 is formed by protruding the surface on the inner diameter side toward the clutch piston 26.

The outer periphery of the oil catch plate 71 is bent in a direction opposite to the side on which the protruded section 75 is protruded, and part of the diameter of the bent section is made small to form a plate convex section 72 that is curved to the inner diameter side.

The outer diameter of the protruded section 75 protruded toward the clutch piston 26 is substantially equal to the distance from the axis O of a carrier 12F to an edge of the lubricating oil introducing hole 60 on the inner diameter side of the carrier 12F.

It should be noted that a large-diameter protruded section 74 with a larger diameter than the diameter from the axis O of the carrier 12F to the lubricating oil introducing hole 60 is formed in part of the protruded section 75 to which the outer diameter side pinion shaft 19 and the inner diameter side pinion shaft 20 are opposed.

The carrier 12F that supports the outer diameter side pinion 13 and the inner diameter side pinion 14 is comprised of a first carrier plate 17F and a second carrier plate 18F.

A carrier concave section 73 is formed in the circumferential direction on an outer side end face of the second carrier plate 18F that supports ends of the outer diameter side pinion shaft 19 and the inner diameter side pinion shaft 20 on the clutch piston 26 side.

The plate convex section 72 of the oil catch plate 71 is fitted into the carrier concave section 73 of the second carrier plate 18F. The oil catch plate 71, which is elastic, is held in the state in which the plate convex section 72 and the carrier concave section 73 are engaged with each other.

It should be noted that the outer diameter section 74 of the oil catch plate 71 and the second carrier plate 18F are contact with each other at a part indicated by diagonal lines in FIG. 13.

An inner part other than the part indicated by the diagonal lines in FIG. 13 serves as an introducing section 44F.

Since the large-diameter protruded section 74 is formed in the protruded section 75 of the oil catch plate 71, the lubricating oil introducing hole 60 and the lubricating oil introducing hole 58 are never closed up by the oil catch plate 71.

A carrier 12F side surface of the protruded section 75 protruded toward the clutch piston 26, the second carrier plate 18F, the outer diameter side pinion shaft 19, and a surface of the inner diameter side pinion shaft 20 on the clutch piston 26 side constitute the introducing section 44F.

a drum cylinder section oil passage 43F is formed in a drum cylinder section 23F to introduce a lubricating oil which pass through the shaft oil passage 40 and the cylinder supporting section oil passage 42 into the introducing section 44F.

The oil having flowed into the introducing section 44F from the drum cylinder section oil passage 43F is supplied as lubricating oil for the carrier 12F to needle bearings and washers on the outer diameter side pinion 13 side through the lubricating oil introducing hole 58 and the lubricating oil supplying hole 59E formed in the outer diameter side pinion shaft 19, as well as to needle bearings and washers on the inner diameter side pinion 14 side through the lubricating oil introducing hole 60 and the lubricating oil supplying hole 61 formed in the inner diameter side pinion shaft 20 so as to lubricate the needle bearings and the washers.

In the present variation, the lubricating oil introducing hole 60 formed in the inner diameter side pinion shaft 20 constitutes an inner diameter side lubricating oil introducing hole of the present invention, and the lubricating oil introducing hole 58 formed in the outer diameter side pinion shaft 19 constitutes an outer diameter side lubricating oil introducing hole of the present invention.

In the present variation, the same effects as those obtained in the above described embodiment can be obtained; i.e. lubricating oil can be supplied to the inner diameter side pinion shaft 20 irrespective of the amount of lubricating oil that can be supplied to the outer diameter side pinion shaft 19, and the shape of the protruded section 75 of the oil catch plate 71 constituting the introducing section 44F can be simplified.

Also, since the oil catch plate 71 is fitted onto the second carrier plate 18F and the introducing section 44F is formed only on the inner diameter side of the oil catch plate 71, the outer diameter side of the oil catch plate 71 is not protruded toward the clutch piston 26 and hence space efficiency can be improved.

A description will now be given of a sixth variation.

Figure 15:
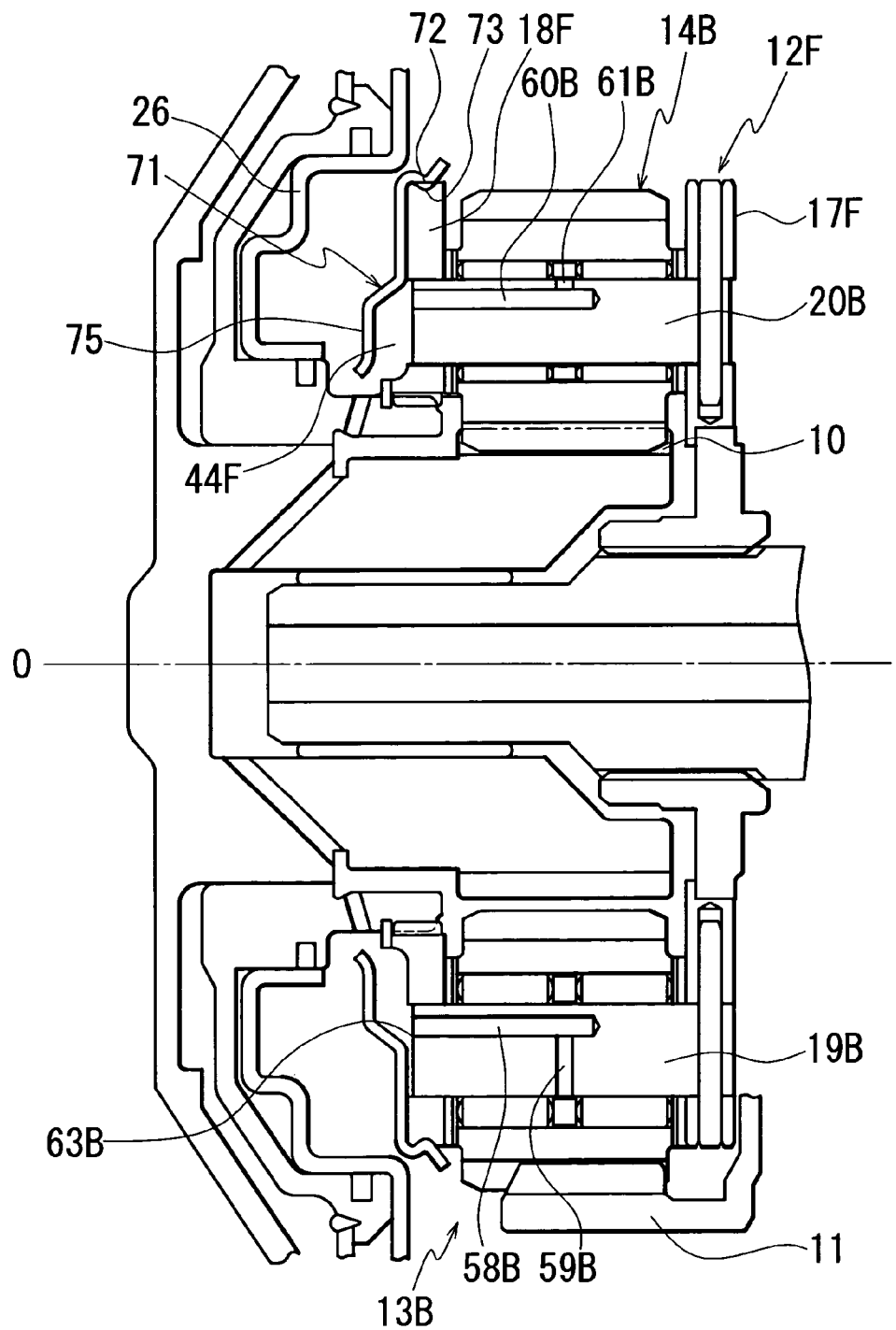
FIG. 15 is an enlarged view showing an outer diameter side pinion and an inner diameter side pinion according to a sixth variation.
Figure 16:
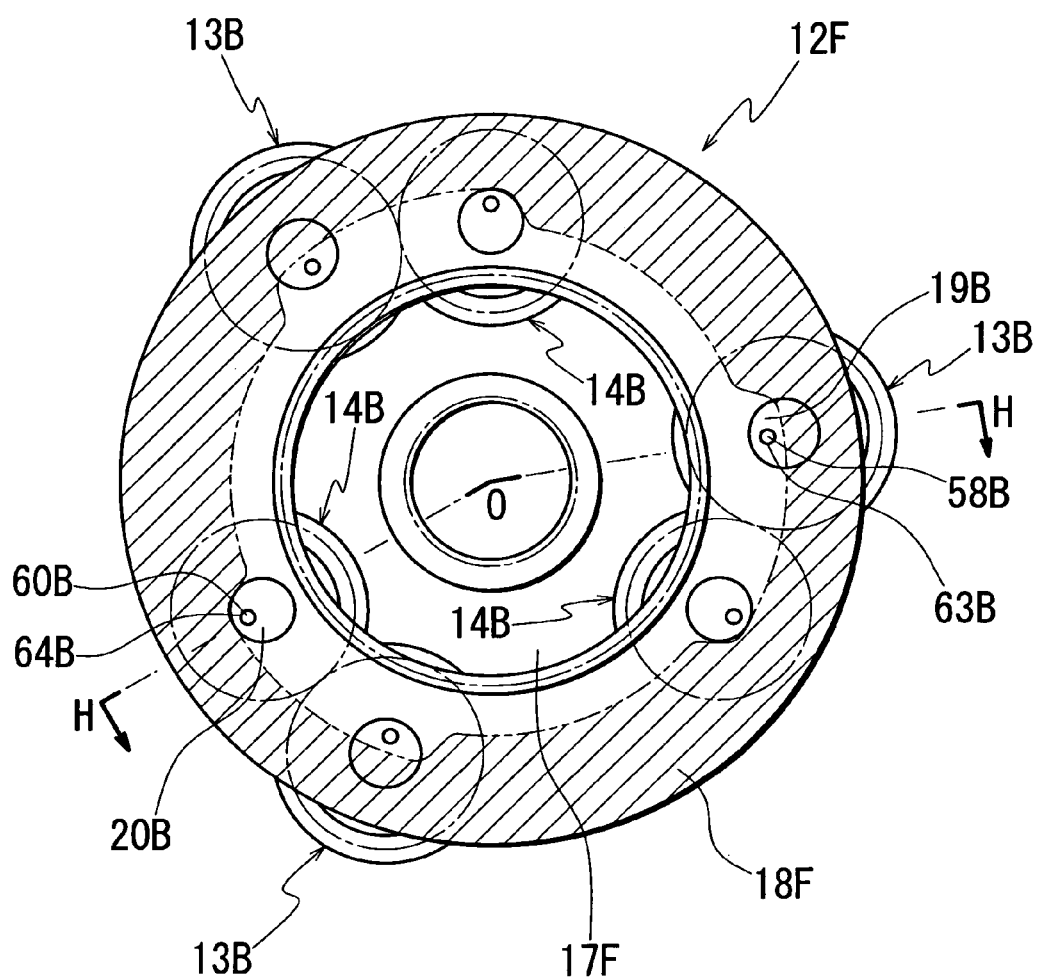
FIG. 16 is a view showing a carrier according to the sixth variation.

FIG. 15 is an enlarged view showing an outer diameter side pinion and an inner diameter side pinion, and FIG. 16 is a view showing a carrier that supports the outer diameter side pinion and the inner diameter side pinion as viewed from a centrifugal cancel piston side. It should be noted that FIG. 15 is a sectional view taken along line H-H in FIG. 16.

In the sixth variation, the oil catch plate 71 used in the fifth variation is used in place of the centrifugal cancel piston 36 in the first variation; parts and elements corresponding to those of the first and fifth variations are denoted by the same reference numerals, and description thereof is omitted.

It should be noted that in the present variation, the lubricating oil introducing hole 60B formed in the inner diameter side pinion shaft 20B constitutes an inner diameter side lubricating oil introducing hole of the present invention, and the lubricating oil introducing hole 58B formed in the outer diameter side pinion shaft 19B constitutes an outer diameter side lubricating oil introducing hole of the present invention.

In the present variation, the same effects as those obtained in the above described embodiment can be obtained; i.e. lubricating oil can be supplied to the inner diameter side pinion shaft 20B irrespective of the amount of lubricating oil that can be supplied to the outer diameter side pinion shaft 19B, and the shape of the protruded section 75 of the oil catch plate 71 constituting the introducing section 44F can be simplified.

Also, since the oil catch plate 71 is fitted onto the second carrier plate 18F and the introducing section 44F is formed only on the inner diameter side of the oil catch plate 71, the outer diameter side of the oil catch plate 71 is not protruded toward the clutch piston 26 and hence space efficiency can be improved.

A description will now be given of a seventh variation.

Figure 17:
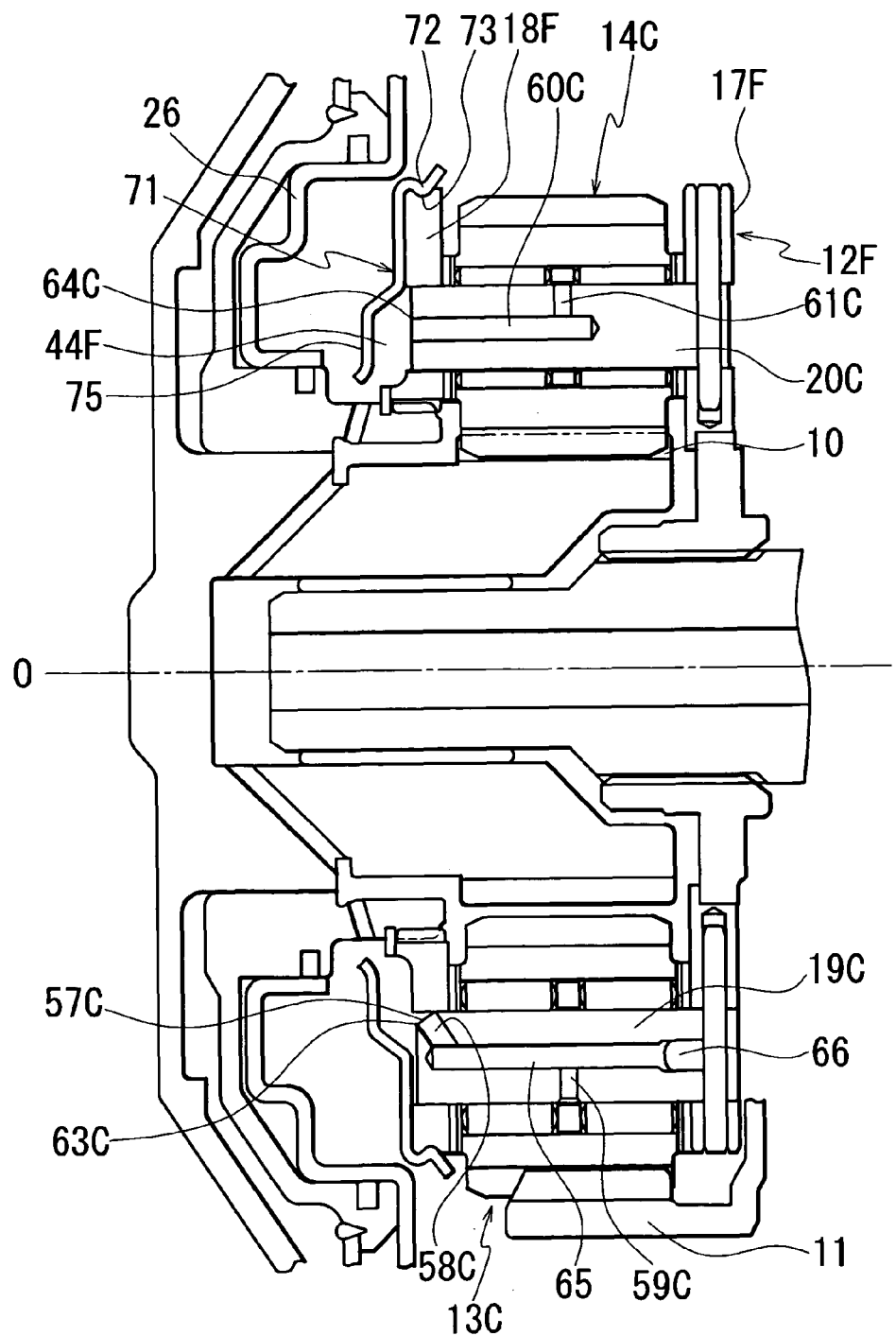
FIG. 17 is an enlarged view showing an outer diameter side pinion and an inner diameter side pinion according to a seventh variation.
Figure 18:
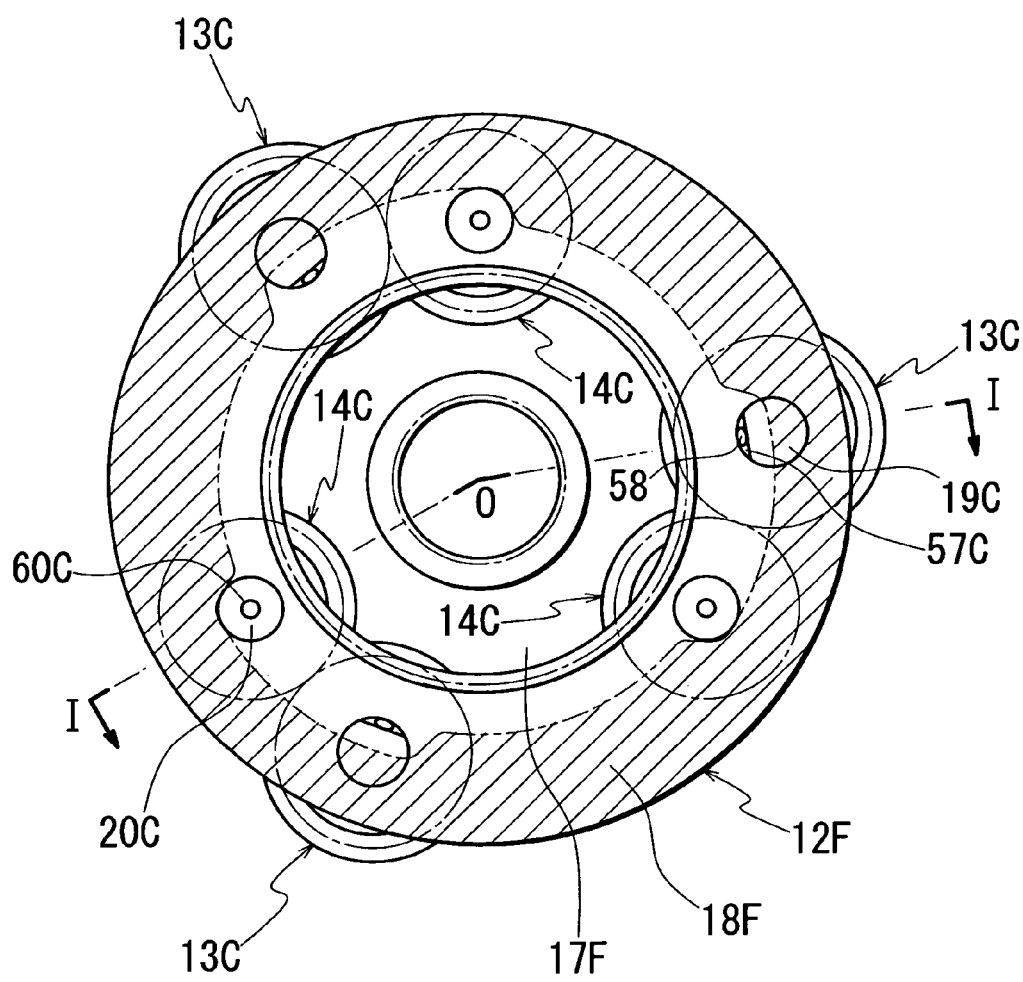
FIG. 18 is a view showing a carrier according to the seventh variation.

FIG. 17 is an enlarged view showing an outer diameter side pinion and an inner diameter side pinion, and FIG. 18 is a view showing a carrier that supports the outer diameter side pinion and the inner diameter side pinion as viewed from a centrifugal cancel piston side. It should be noted that FIG. 17 is a sectional view taken along line I-I in FIG. 18.

In the seventh variation, the oil catch plate 71 used in the fifth variation is used in place of the centrifugal cancel piston 36 in the second variation; parts and elements corresponding to those of the second and fifth variations are denoted by the same reference numerals, and description thereof is omitted.

It should be noted that in the present variation, the lubricating oil introducing hole 60C formed in the inner diameter side pinion shaft 20C constitutes an inner diameter side lubricating oil introducing hole of the present invention, and the lubricating oil introducing hole 58C formed in the outer diameter side pinion shaft 19C constitutes an outer diameter side lubricating oil introducing hole of the present invention.

In the present variation, the same effects as those obtained in the above described embodiment can be obtained; i.e. lubricating oil can be supplied to the inner diameter side pinion shaft 20C irrespective of the amount of lubricating oil that can be supplied to the outer diameter side pinion shaft 19C, and the shape of the protruded section 75 of the oil catch plate 71 constituting the introducing section 44F can be simplified.

Also, since the oil catch plate 71 is fitted onto the second carrier plate 18F and the introducing section 44F is formed only on the inner diameter side of the oil catch plate 71, the outer diameter side of the oil catch plate 71 is not protruded toward the clutch piston 26 and hence space efficiency can be improved.

A description will now be given of an eighth variation.

Figure 19:
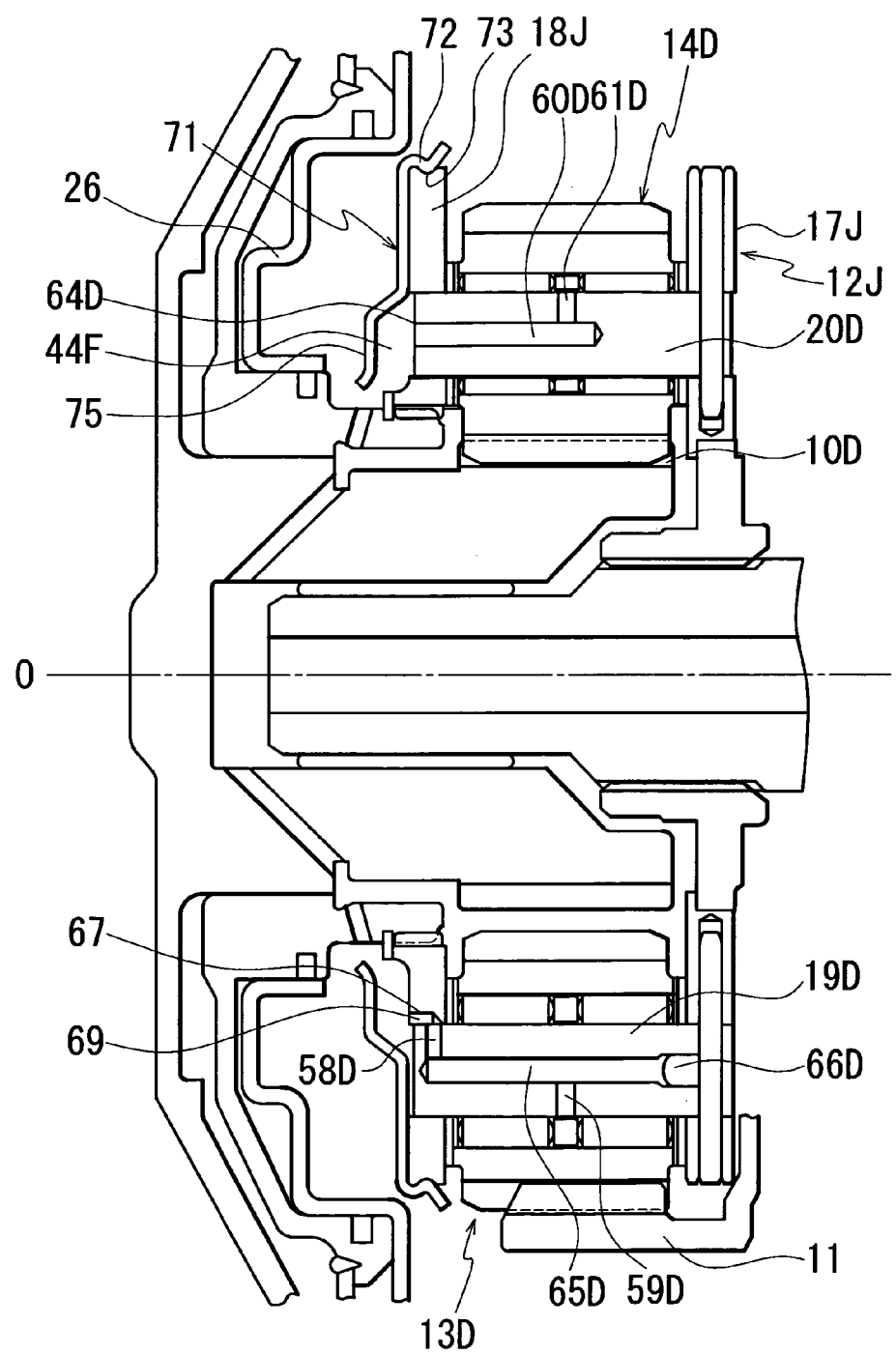
FIG. 19 is an enlarged view showing an outer diameter side pinion and an inner diameter side pinion according to an eighth variation.
Figure 20:
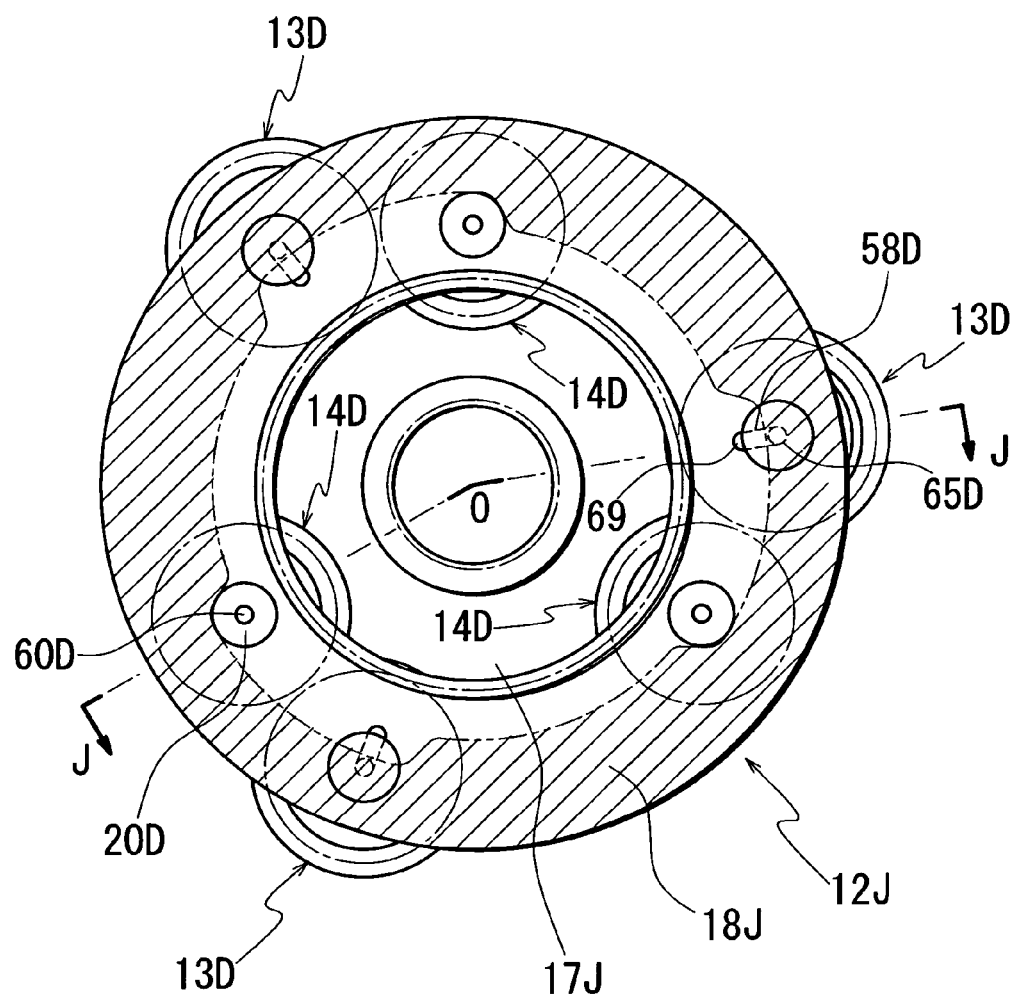
FIG. 20 is a view showing a carrier according to the eighth variation.

FIG. 19 is an enlarged view showing an outer diameter side pinion and an inner diameter side pinion, and FIG. 20 is a view showing a carrier that supports the outer diameter side pinion and the inner diameter side pinion as viewed from a centrifugal cancel piston side. It should be noted that FIG. 19 is a sectional view taken along line J-J in FIG. 20.

In the eighth variation, the oil catch plate 71 used in the fifth variation is used in place of the centrifugal cancel piston 36 in the third variation; parts and elements corresponding to those of the third and fifth variations are denoted by the same reference numerals, and description thereof is omitted.

A carrier 12J that supports the outer diameter side pinion 13D and the inner diameter side pinion 14D is comprised of a first carrier plate 17J and a second carrier plate 18J.

The oil catch plate 71 is held by fitting the plate convex section 72 of the oil catch plate 71 into the carrier concave section 73 of the second carrier plate 18J.

It should be noted that in the present variation, the lubricating oil introducing hole 60D formed in the inner diameter side pinion shaft 20D constitutes an inner diameter side lubricating oil introducing hole of the present invention, and the carrier oil passage 69 constitutes an outer diameter side lubricating oil introducing hole of the present invention.

In the present variation, the same effects as those obtained in the above described embodiment can be obtained; i.e. lubricating oil can be supplied to the inner diameter side pinion shaft 20D irrespective of the amount of lubricating oil that can be supplied to the outer diameter side pinion shaft 19D, and the shape of the protruded section 75 of the oil catch plate 71 constituting the introducing section 44F can be simplified.

Also, since the oil catch plate 71 is fitted onto the second carrier plate 18J and the introducing section 44F is formed only on the inner diameter side of the oil catch plate 71, the outer diameter side of the oil catch plate 71 is not protruded toward the clutch piston 26 and hence space efficiency can be improved.

A description will now be given of a ninth variation.

Figure 21:
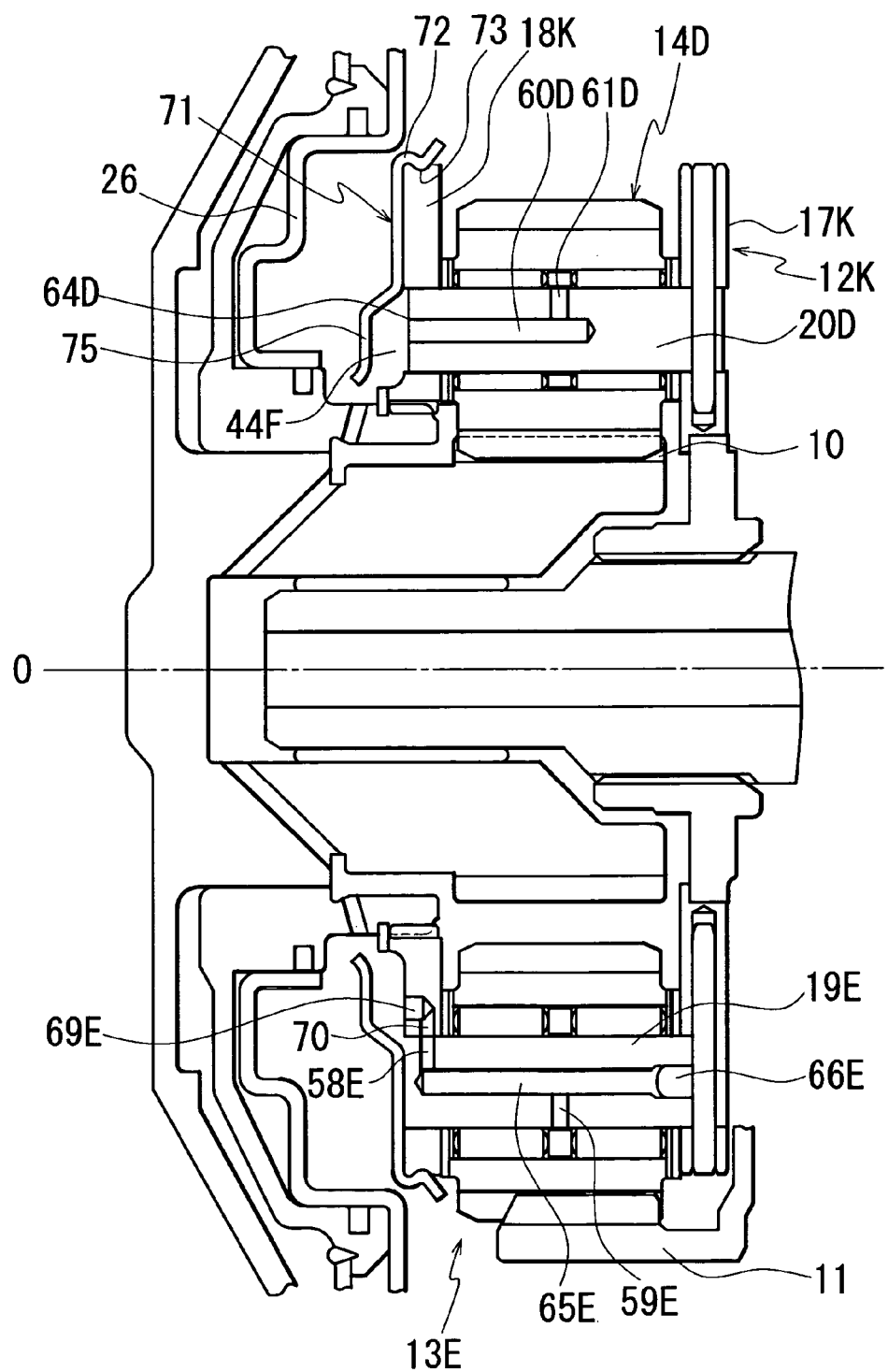
FIG. 21 is an enlarged view showing an outer diameter side pinion and an inner diameter side pinion according to a ninth variation.
Figure 22:
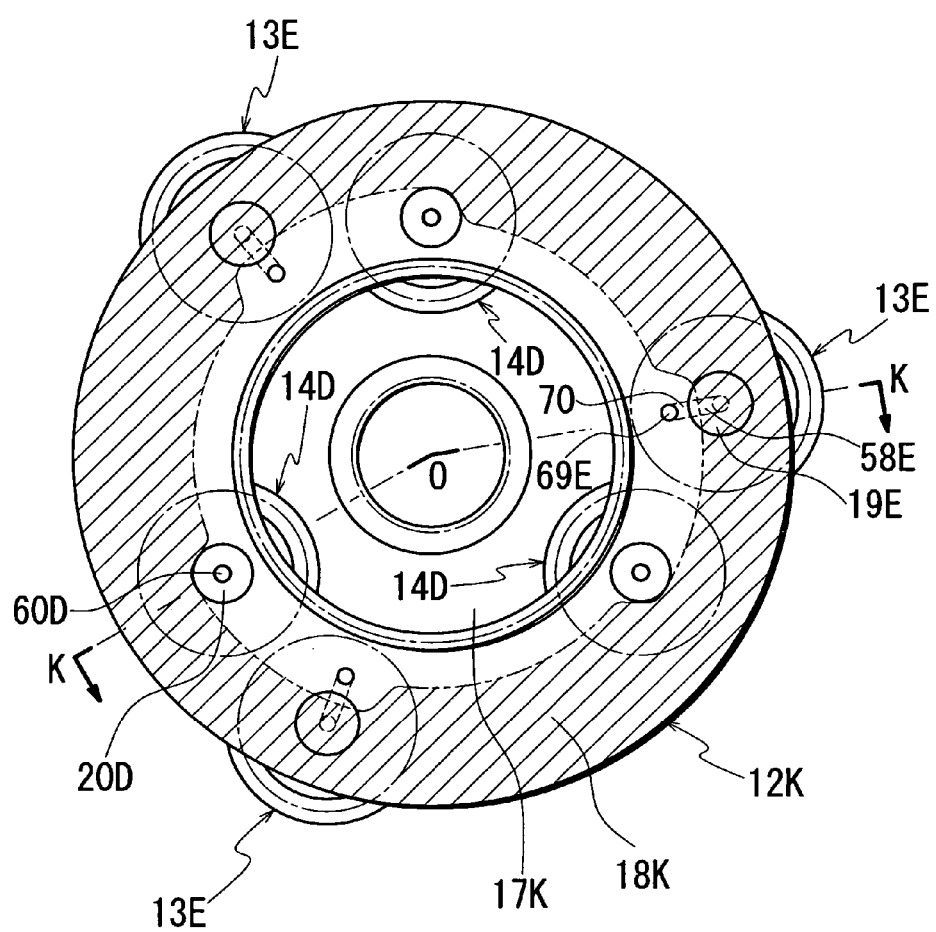
FIG. 22 is a view showing a carrier according to the ninth variation.

FIG. 21 is an enlarged view showing an outer diameter side pinion and an inner diameter side pinion, and FIG. 22 is a view showing a carrier that supports the outer diameter side pinion and the inner diameter side pinion as viewed from a centrifugal cancel piston side. It should be noted that FIG. 21 is a sectional view taken along line K-K in FIG. 22.

In the ninth variation, the oil catch plate 71 used in the fifth variation is used in place of the centrifugal cancel piston 36 in the fourth variation; parts and elements corresponding to those of the fourth and fifth variations are denoted by the same reference numerals, and description thereof is omitted.

A carrier 12K that supports the outer diameter side pinion 13E and the inner diameter side pinion 14D is comprised of a first carrier plate 17K and a second carrier plate 18K.

The oil catch plate 71 is held by fitting the plate convex section 72 of the oil catch plate 71 into the carrier concave section 73 of the second carrier plate 18K.

It should be noted that in the present variation, the lubricating oil introducing hole 60D formed in the inner diameter side pinion shaft 20D constitutes an inner diameter side lubricating oil introducing hole of the present invention, and the carrier oil passage 69E constitutes an outer diameter side lubricating oil introducing hole of the present invention.

In the present variation, the same effects as those obtained in the above described embodiment can be obtained; i.e. lubricating oil can be supplied to the inner diameter side pinion shaft 20D irrespective of the amount of lubricating oil that can be supplied to the outer diameter side pinion shaft 19E, and the shape of the protruded section 75 of the oil catch plate 71 constituting the introducing section 44F can be simplified.

Also, since the oil catch plate 71 is fitted onto the second carrier plate 18K and the introducing section 44F is formed only on the inner diameter side of the oil catch plate 71, the outer diameter side of the oil catch plate 71 is not protruded toward the clutch piston 26 and hence space efficiency can be improved.

What is claimed is:

1. A lubricating structure of a double pinion planetary gear mechanism, comprising:
    a carrier that supports an inner diameter side pinion shaft of an inner diameter side pinion and supports an outer diameter side pinion shaft of an outer diameter side pinion disposed on an outer side of the inner diameter side pinion shaft, the inner diameter side pinion shaft and the outer diameter side pinion being engaged with each other; and
    an oil catch plate provided on a side face of said carrier, said oil catch plate forming an introducing section for introducing lubricating oil from an inner diameter side of said carrier into the inner diameter side pinion and the outer diameter side pinion,
    wherein an inner diameter side lubricating oil introducing hole and an outer diameter side lubricating oil introducing hole for introducing lubricating oil are formed in respective end faces of the inner diameter side pinion and the outer diameter side pinion on a side of said oil catch plate,
    wherein a distance from an axis of said carrier to an outermost edge of the outer diameter side lubricating oil introducing hole in a direction of a diameter of said carrier and a distance from the axis of said carrier to an outermost edge of the inner diameter side lubricating oil introducing hole in a radial direction of the diameter of said carrier are equal to each other,
    wherein the inner diameter side lubricating oil introducing hole of the inner diameter side pinion shaft and the outer diameter side lubricating oil introducing hole of the outer diameter side pinion shaft are open to a common area of the introducing section, and
    wherein said common area extends circumferentially over the outer diameter side lubricating oil introducing hole and the inner diameter side lubricating oil introducing hole.

2. A lubricating structure of a double pinion planetary gear mechanism according to claim 1, further comprising:
    a clutch piston that moves toward said carrier to force an engaging section of the planetary gear mechanism,
    wherein said oil catch plate comprises centrifugal cancel piston that cooperates with the clutch piston to form a centrifugal cancel oil chamber in a direction in which the clutch piston moves in forcing the engaging section provided on a side of the outer diameter side pinion and the inner diameter side pinion on which the outer diameter side lubricating oil introducing hole and the inner diameter side lubricating oil introducing hole are provided; and
    a sealing member attached to an outer diameter side of the centrifugal cancel piston,
    wherein the centrifugal cancel piston, the sealing member, and the side face of said carrier constitute the introducing section.

3. A lubricating structure of a double pinion planetary gear mechanism according to claim 1, wherein said oil catch plate is fixed to said carrier.

* * * * *